(12) United States Patent
Gill

(10) Patent No.: US 12,128,485 B2
(45) Date of Patent: *Oct. 29, 2024

(54) PORTABLE ELECTRICAL DRILLING ASSEMBLY WITH REVERSIBLY COUPLED SPLINED SHAFT

(71) Applicant: Hougen Manufacturing, Inc., Swartz Creek, MI (US)

(72) Inventor: Jeffrey Steven Gill, Davison, MI (US)

(73) Assignee: Hougen Manufacturing, Inc., Swartz Creek, MI (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/894,391

(22) Filed: Aug. 24, 2022

(65) Prior Publication Data

US 2023/0141146 A1    May 11, 2023

Related U.S. Application Data

(60) Provisional application No. 63/277,840, filed on Nov. 10, 2021.

(51) Int. Cl.
*B23Q 5/32* (2006.01)
*B23B 45/00* (2006.01)

(52) U.S. Cl.
CPC .............. *B23B 45/008* (2013.01); *B23Q 5/32* (2013.01)

(58) Field of Classification Search
CPC ............ B23B 45/008; B23Q 5/32; B25F 5/00
See application file for complete search history.

(56) References Cited

U.S. PATENT DOCUMENTS

| 929,399 | A | * | 7/1909 | Cunningham | ........... B23Q 5/32 470/167 |
| 3,487,729 | A | * | 1/1970 | Juhasz | ................... B23Q 5/326 408/14 |

(Continued)

FOREIGN PATENT DOCUMENTS

| EP | 1099518 A2 | 5/2001 |
| GB | 2335871 A | 10/1999 |
| WO | 0020150 A1 | 4/2000 |

OTHER PUBLICATIONS

U.S. Appl. No. 17/894,375, filed Aug. 24, 2022.

*Primary Examiner* — Lucas E. A. Palmer
(74) *Attorney, Agent, or Firm* — Howard & Howard Attorneys PLLC

(57) ABSTRACT

A portable electrical drilling assembly includes an electric motor rotating a gear contained within a gear box housing, a connector reversibly coupling the gear to a splined shaft with the splined shaft extending within and engaging an internal surface of a cutter or reamer with the shaft and cutter/reamer defining a cutter-spline drive, a pivoting power feed mechanism coupled to the gear box housing, and a spindle coupled to the feed mechanism for receiving the cutter or reamer. The gear rotation rotates the splined shaft and reamer/cutter to drill/ream a hole, with the pivoting of the power feed mechanism controlling the depth of the drilled or reamed hole. The separate coupling of the splined shaft and cutter/reamer and interchangeability of cutters/reamers allows the assembly to be used in a confined space while still achieving deep drilling of holes in workpieces. The cutter-spline drive can be used in other drilling assemblies.

22 Claims, 30 Drawing Sheets

(56) References Cited

U.S. PATENT DOCUMENTS

| | | | |
|---|---|---|---|
| 3,679,320 A * | 7/1972 | Bohorquez | B23B 45/008 |
| | | | 408/110 |
| 4,419,032 A | 12/1983 | Flowers | |
| 4,688,970 A | 8/1987 | Eckman | |
| 4,948,308 A | 8/1990 | Giannuzzi et al. | |
| 5,888,033 A * | 3/1999 | Zagar | B23Q 1/70 |
| | | | 408/124 |
| 5,902,076 A * | 5/1999 | Miller | B25H 1/0071 |
| | | | 408/11 |
| 6,280,123 B1 | 8/2001 | Gill | |
| 6,974,284 B2 | 12/2005 | Omi | |
| 7,001,117 B2 * | 2/2006 | Mikiya | B23Q 1/28 |
| | | | 408/141 |
| 7,832,496 B2 * | 11/2010 | Nakayabu | B28D 1/14 |
| | | | 173/39 |
| 8,246,279 B2 | 8/2012 | Wrobel | |
| 8,292,550 B2 * | 10/2012 | Janson | B23Q 5/326 |
| | | | 408/137 |
| 8,382,402 B2 | 2/2013 | Sassatelli et al. | |
| 9,168,592 B1 | 10/2015 | Stavig, Jr. et al. | |
| 9,770,763 B2 * | 9/2017 | Guerin | B23B 45/008 |
| 2023/0147105 A1 * | 5/2023 | Gill | B23B 45/008 |
| | | | 173/213 |

\* cited by examiner

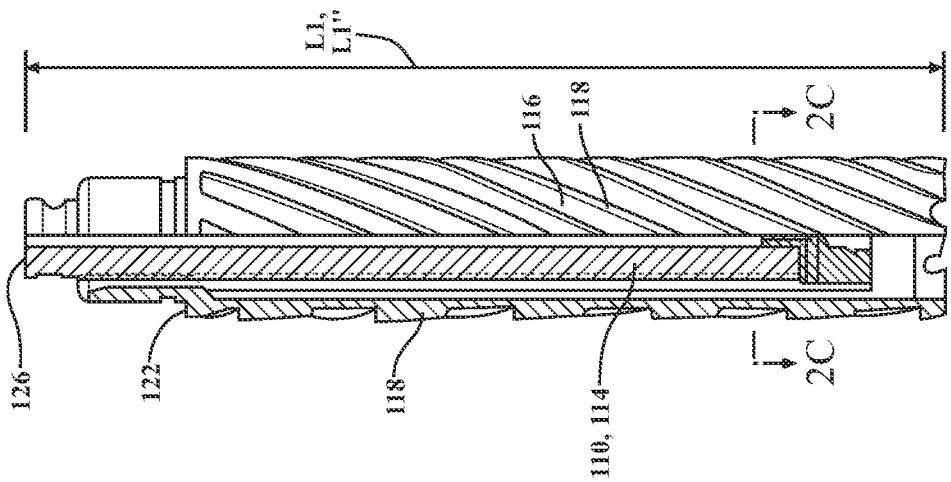
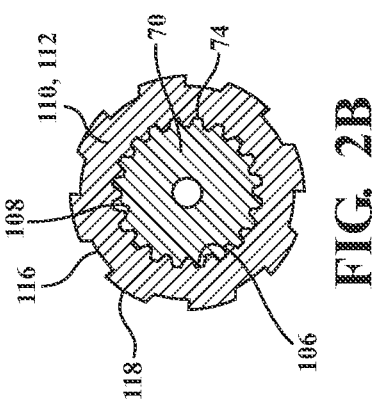
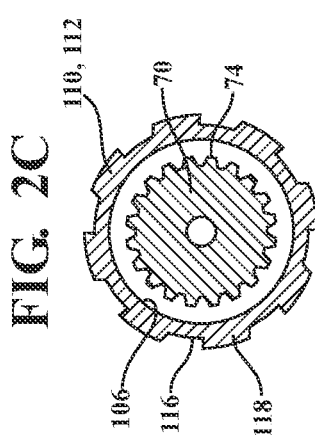
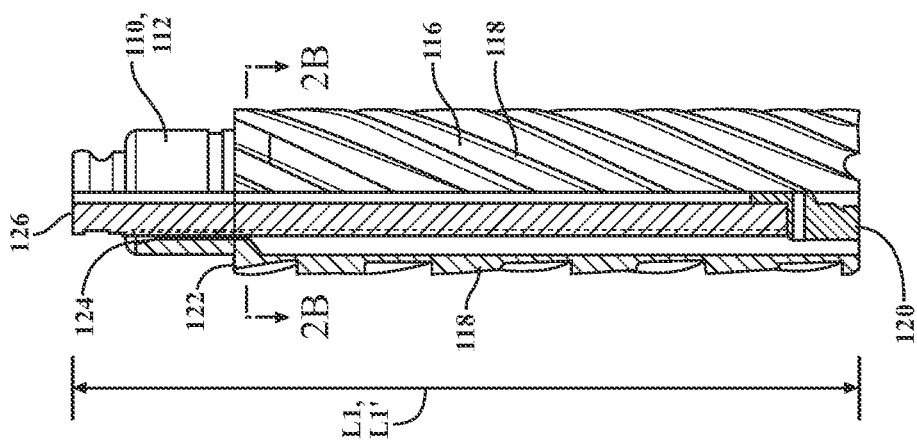

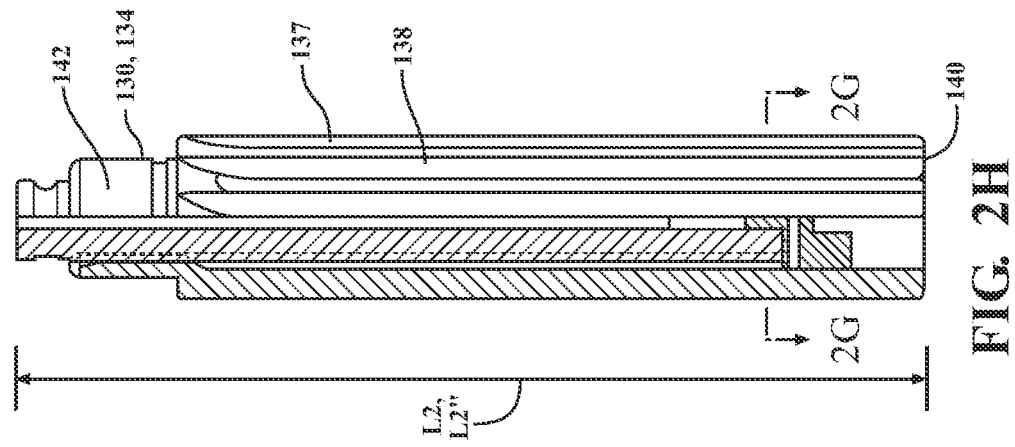
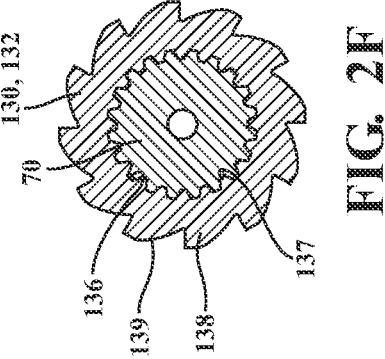
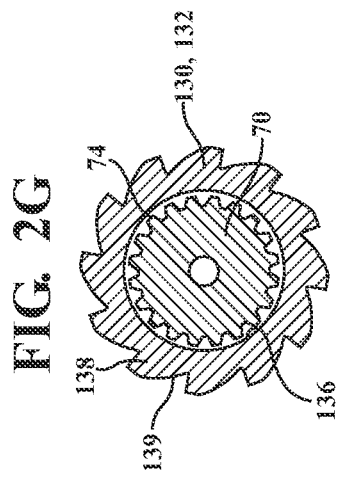
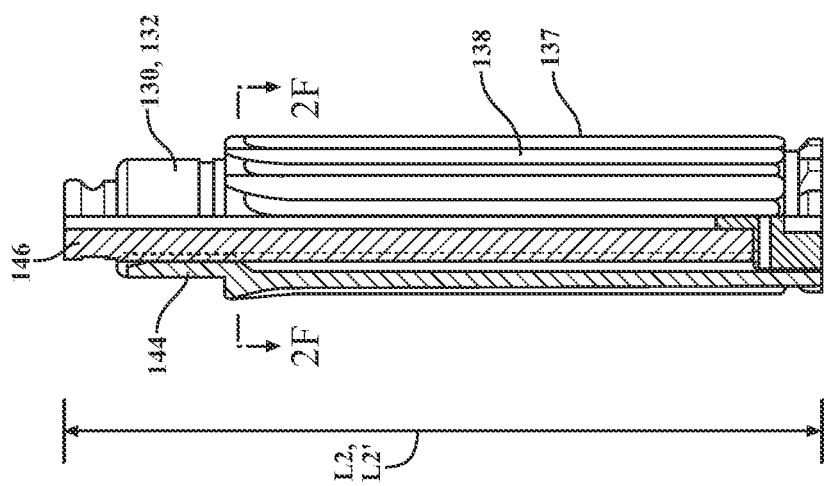

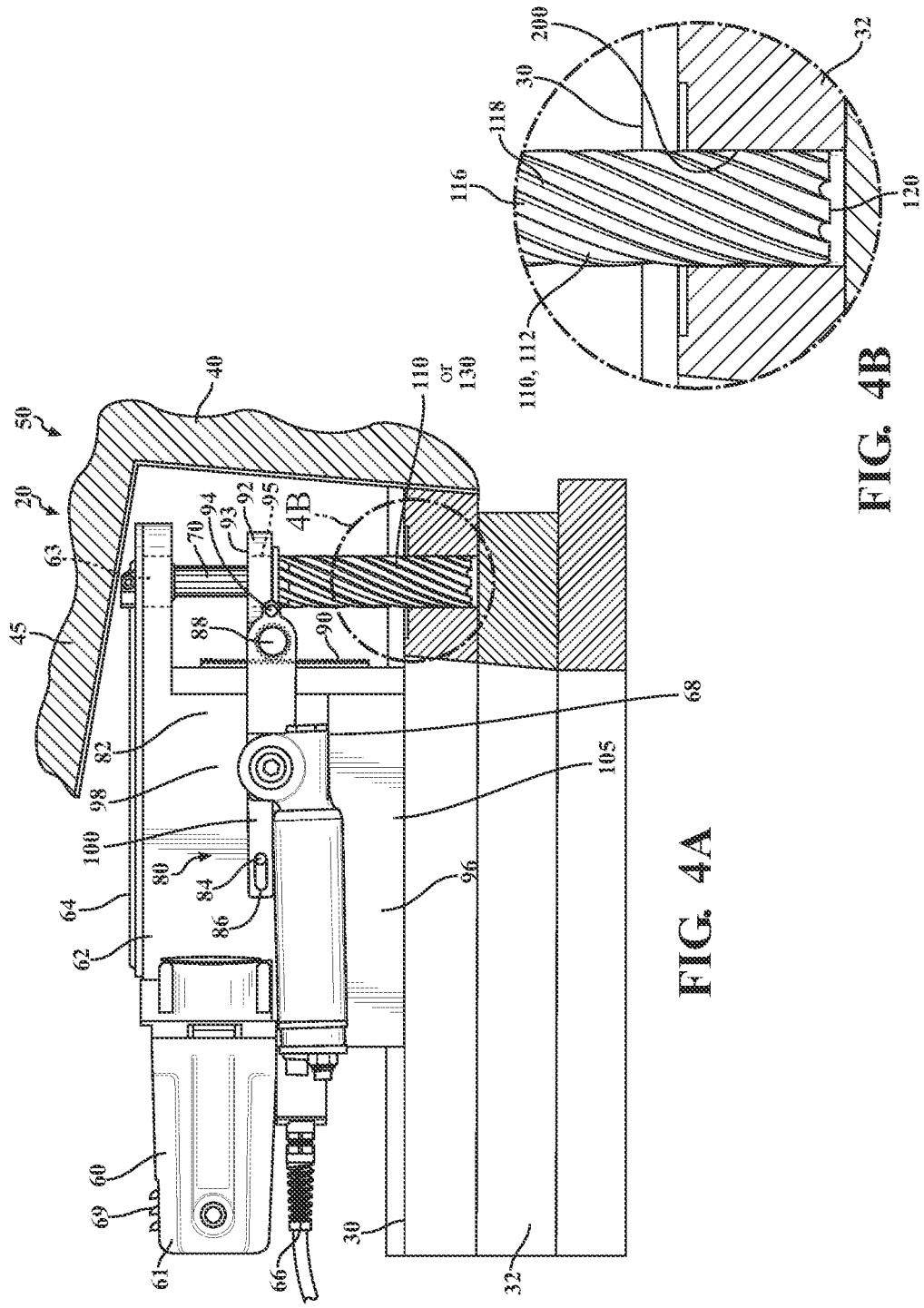

PORTABLE ELECTRICAL DRILLING ASSEMBLY WITH REVERSIBLY COUPLED SPLINED SHAFT

CROSS-REFERENCE TO RELATED APPLICATIONS

This application claims the benefit of U.S. Provisional Application No. 63/277,840 filed Nov. 10, 2021 and entitled "Cutter Spline Drive for Portable Electrical Drilling Assembly", the disclosure of which is herein incorporated by reference in its entirety.

TECHNICAL FIELD

The subject application relates, generally, to portable electrical drill assemblies and more particular to a cutter-spline drive for a portable electrical drilling assembly.

BACKGROUND

Portable electrical drilling assemblies are utilized in many industries for a wide variety of uses. Such portable electrical assemblies typically include an electric motor that is used to allow the portable electrical assembly to perform a particular function.

In certain applications, such as for use in deep drilling a workpiece positioned within a confined space surrounded by walls and ceilings or other encumbrances, it is very difficult to drill deep holes within a working surface of a workpiece due to the size and shape of the drilling assembly itself.

Moreover, in certain applications where there might be enough clearance to operate the drilling, there may not be enough room to remove various size cutters or reamers used to initially drill the deep holes and subsequently ream the drilled holes to a desired diameter. Drilling such holes is thus an inefficient process requiring makeshift tooling for particular applications.

In particular, there are no current commercial off-the-shelf (COTS) portable drills that can meet hole dimension precision parameters with space constraint requirements found in certain applications. Thus, there is a growing need for lightweight, portable electrical drill assemblies that have enough power to drill up to a two-inch diameter hole through up to 6-7 inches of metal such as steel with space constraint requirements found in certain applications.

Accordingly, it is desired to provide a portable electrical assembly that addresses two main issues with current COTS portable drills, namely in reducing the drilling assembly footprint for use in confined spaces and providing for alternative drilling methods that reduce the number of steps necessary to achieve a desired final hole dimensional requirement.

SUMMARY OF THE DISCLOSURE

The subject application is directed to a portable electrical drilling assembly that can be utilized in confined space deep hole drilling applications that addresses the two main issues with current COTS portable drills as described above.

In particular, the portable electrical drilling assembly of the subject application is configured to mount to a working surface of a workpiece and is used to drill and subsequently ream holes within the working surface of the workpiece, particularly where the working surface is in a confined space that is difficult to access, such as being in close proximity to a wall and/or roof or another encumbrance. In addition, the portable electrical drilling assembly allows for deep hole drilling in these confined spaces with a full range of up and down travel of the portable electrical drilling assembly which is not possible for most conventional portable electrical drilling assemblies (COTS) due to the need for movement up and down that is limited in these confined spaces.

The portable electrical drilling assembly includes an electric motor coupled to a gear box having one or more rotating gears contained within a gear box housing. The drilling assembly also includes a feed mechanism coupled to the gear box and movable relative to the gear box between a plurality of positions including a raised position and a lowered position. The drilling assembly also includes a spindle coupled to the feed mechanism and having an outer ring portion and an inner ring portion positioned within and rotatable relative to the outer ring portion, with the spindle configured to move rectilinearly toward or away from the surface of the workpiece as the feed mechanism moves between the plurality of positions. The drilling assembly also includes a cutting workpiece, such as a cutter or reamer, coupled to said inner ring portion, with the cutting component including an internal surface defining a component cavity. The drilling system also includes a splined shaft connected to one of said gears and rotatable when the one or more gears are rotating, wherein a length of the splined shaft includes a series of splines slidingly received within the component cavity and engaged with the internal surface of the cutting component, with the rotation of the splined shaft rotating the cutting component, and with the rotation of the cutting component rotating the inner ring portion within the outer ring portion of the spindle.

The movement of the feed mechanism, with the associated rectilinear movement of the spindle, adjusts the depth of the cutting component within the working surface of the workpiece to control the dimensional requirements of the desired final hole, in terms of depth and diameter, within the working surface.

By allowing for the separate connection of the splined shaft and the cutting component prior to the operation of the portable electrical drilling assembly, the drilling assembly footprint can be reduced for use in confined spaces and provides for a method for drilling deep holes having a reduced number of steps necessary to achieve the desired final hole dimensional requirements.

The portable electrical drilling assembly allows for the use of different length and dimensioned cutting components for use with a common splined shaft as a part of the cutter-spline drive that therefore allow the assembly to easily drill and ream holes of varying depths and inner radial dimensions using a maximum stroke length of the drilling assembly, as calculated herein in a further embodiment, without increasing the footprint of portable electrical drilling assembly between its raised and lowered positions.

Still further, the subject application is directed to an associated method for drilling holes in a surface of workpiece utilizing the portable drilling assembly as described above, including for use in such drilling within a confined space.

Even still further, the subject application is also directed to the use of the cutter-spline drive including the combination of the cutting components, and the use of the cutting components described herein alone, in a wide variety of drilling assemblies in addition to the portable electrical drilling assembly described herein.

BRIEF DESCRIPTION OF THE DRAWINGS

Other advantages of the subject application will be readily appreciated, as the same becomes better understood by reference to the following detailed description when considered in connection with the accompanying drawings.

FIG. 2A is a front perspective and partial section view of a cutter of FIG. 1 engaged with the splined shaft and with the cutter having a length L1';

FIG. 2B is a section view of FIG. 2A taken along line 2B-2B;

FIG. 2C is a section view of FIG. 2D taken along line 2C-2C;

FIG. 2D is a front perspective and partial section view of a cutter of FIG. 1 engaged with the splined shaft and with the cutter having a length L1";

FIG. 2E is a front perspective and partial section view of a reamer of FIG. 1 engaged with the splined shaft and with the reamer having a length L2';

FIG. 2F is a section view of FIG. 2E taken along line 2F-2F;

FIG. 2G is a section view of FIG. 2H taken along line 2G-2G;

FIG. 2H is a front perspective and partial section view of a reamer of FIG. 1 engaged with the splined shaft and with the reamer having a length L2";

FIG. 4A is a front and close-up perspective view of the portable drilling assembly of FIG. 3A in an intermediate position with the cutter of FIG. 2A positioned within a pilot hole of the working surface;

FIG. 4B is a close-up perspective view of the portable drilling assembly of FIG. 4A within circle 4B;

DETAILED DESCRIPTION

Referring now to Figures, wherein like numerals indicate corresponding parts throughout the several views, a portable electrical drilling assembly, illustrated and described hereinafter in one exemplary embodiment as a magnetically mountable portable electric drill machine ("magdrill"), is shown generally at 20.

Figure 1:
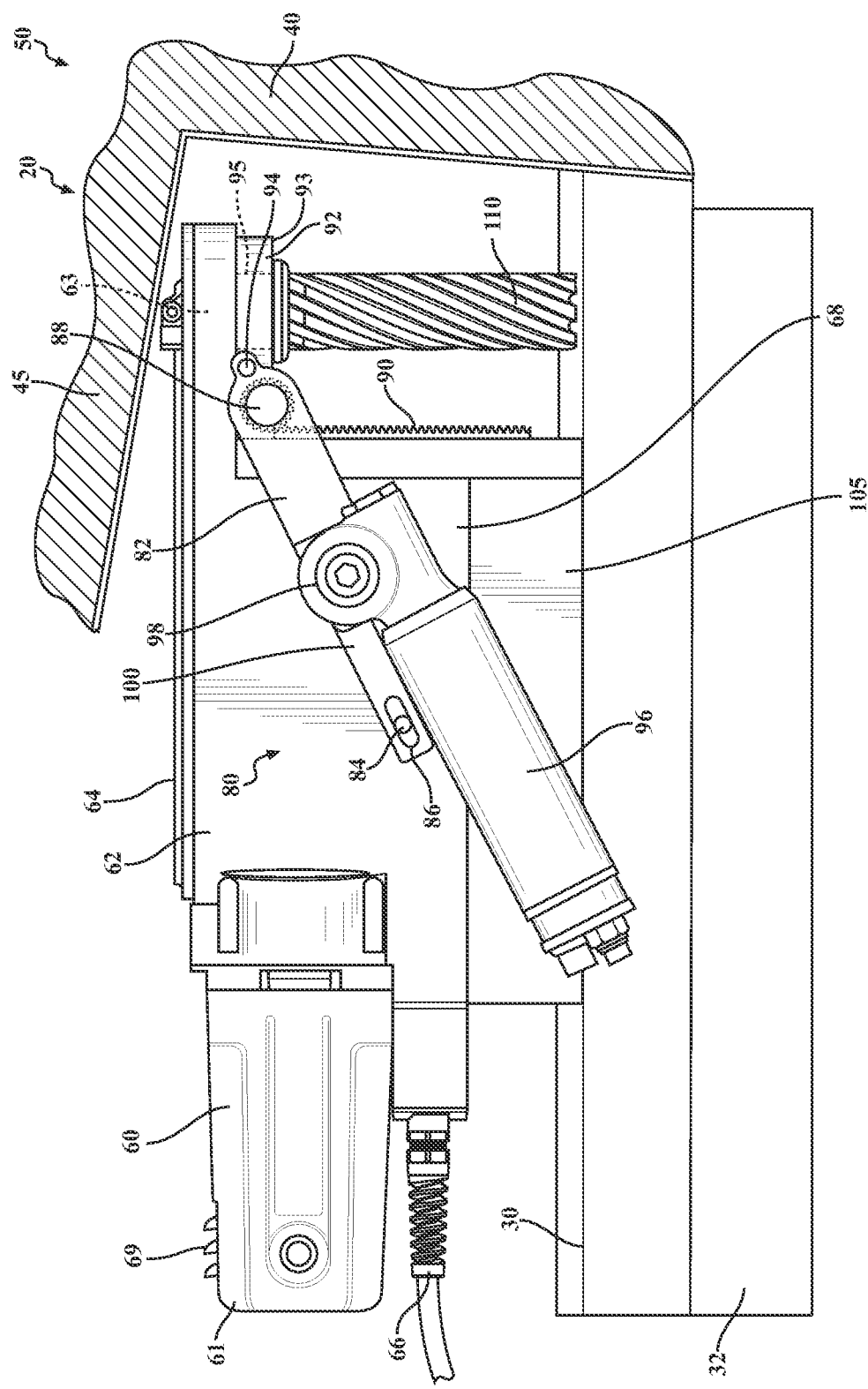
FIG. 1 is a front perspective view of a portable electrical drilling assembly according to one embodiment of the subject application including a feed mechanism having a pneumatic actuator and associated components with the portable electrical drilling assembly in a raised position and positioned onto a working surface of a workpiece to be drilled within a confined space.

Referring generally to FIG. 1, the portable electrical drilling assembly 20 (sometimes referred to hereinafter as drilling assembly 20 or more simply as an assembly 20) in accordance with one exemplary embodiment is configured to mount to a working surface 30 of a workpiece 32 and is used to drill and subsequently ream holes within the working surface 30 of the workpiece 32, particularly where the working surface 30 is in a confined space that is difficult to access, such as being in close proximity to a wall 40 and/or roof 45 or another encumbrance (i.e., within a confined space 50). In addition, the portable electrical drilling assembly 20 allows for deep hole drilling in these confined spaces 50 with a full range of up and down travel of the portable electrical drilling assembly 20 which is not possible for most conventional portable electrical drilling assemblies due to the need for movement up and down that is limited in these confined spaces.

The portable electrical drilling assembly 20 includes, as its major components, an electric motor 60 (sometimes referred to simply as a motor 60) having a motor housing 61 with the motor 60 coupled to a gear box 62 having one or more rotating gears 63 (see FIG. 11) contained within a gear box housing 64. The gear box housing 64 includes an electrical connector 66 for coupling an electrical power source (not shown) to the electric motor 60, with the actuation of the electrical power source by a user/operator functioning to initiate the motor 60 to rotate the gears 63 contained within the gear box housing 64. The motor housing 61 may include one or more vents 69 that function to provide an air passage for aiding in cooling the electric motor 60 during operation.

Figure 11A:
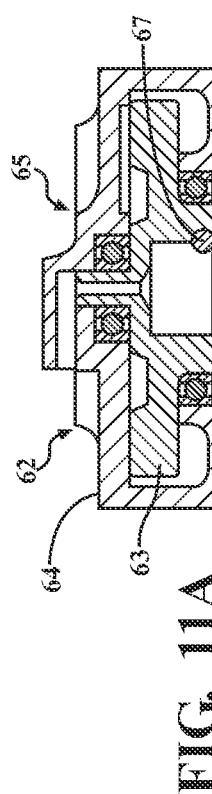
FIG. 11A is a perspective view of the splined shaft aligned to the gear in the gear box housing in an uncoupled position.
Figure 11B:
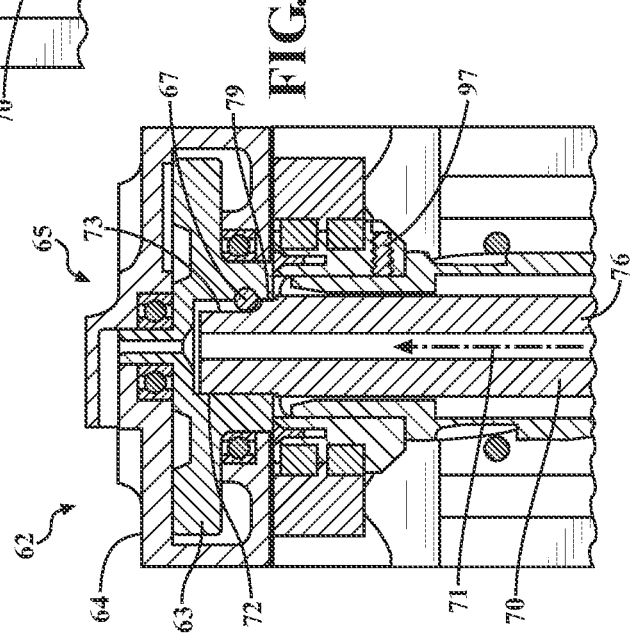
FIG. 11B is a perspective view of the splined shaft aligned to the gear in the gear box housing of FIG. 11A in a coupled position but uncoupled state.
Figure 11C:
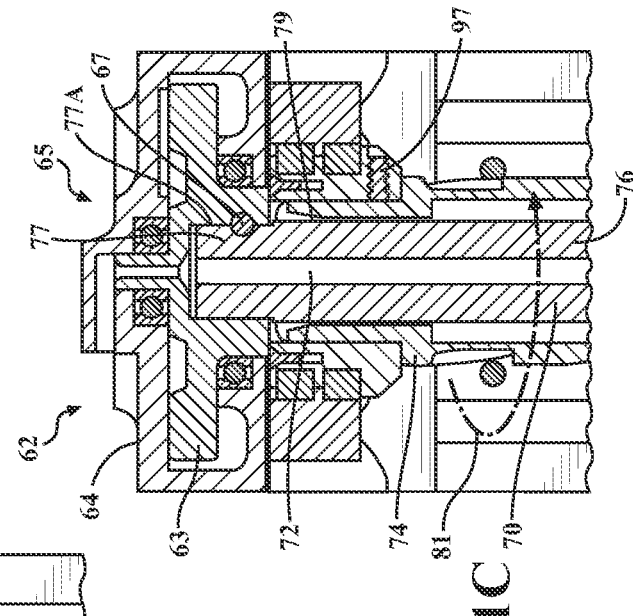
FIG. 11C is a perspective view of the splined shaft aligned to the gear in the gear box housing of FIG. 11A in the coupled position and coupled state.

As best shown in FIGS. 11A, 11B, and 11C, the gear box 62 and/or the gear 63 also includes an internal quick connection mechanism 65 (sometimes referred to alternatively as a quick connector 65) for connecting to a corresponding turned and milled upper end feature 72 of a splined shaft 70 to the gear 63. In certain embodiments, such as best shown in FIGS. 11A, 11B, and 11C, the internal quick connection mechanism 65 includes a steel pin 67 that is positioned within an internal opening 63A of the gear 63, although in other embodiments the quick connection mechanism 65 may be include a ball bearing (not shown) contained within another portion of the gear housing 64 in proximity to the gear 63. The length of the splined shaft 70 includes a series of splines 74 extending along its outer circumferential surface 79 (see FIG. 5) that extend between a turned and milled upper end feature 72 to a bottom end 76. The turned and milled upper end feature 72, in accordance with certain embodiments and as illustrated in the Figures, includes an inwardly extending recessed portion 73 contained within the outer circumferential surface 79 of the splined shaft 70. Still further, a portion of the inwardly extending recessed portion 73 includes a ledge 77 (see FIG. 11C) extending radially outwardly, with the outward surface 77A of the ledge 77 aligned with the outer circumferential surface 79 of the splined shaft closer to the bottom end 76.

Returning back to FIG. 1, in certain embodiments, the drilling assembly 20 also includes a feed mechanism 80 having a mechanism housing 82 pivotally coupled to the gear box housing 64 with a fastening mechanism 84, here shown as a pin 84 contained within a slot 86 defined by the mechanism housing 82. The feed mechanism 80 includes a pinion gear 88 rotatably coupled and engaged to a rack 90. The drilling assembly 20 also includes a spindle 92, preferably a ring-shaped spindle 92 having an outer fixed portion 93, coupled to an end 94 of the mechanism housing 82 generally adjacent to the pinion gear 88. The spindle 92 also includes an inner ring portion 95 contained within the outer fixed portion 93 which is rotatable relative to the outer fixed portion 95. In particular, the pinion gear 88 is engaged (i.e., intermeshed) with the teeth 91 of the rack 90 and moves along the rack 90 as it rotates to achieve rectilinear movement of both the pinion gear 88 and the spindle 92 (i.e., up and down movement as illustrated in the Figures) during a drilling operation. The inner ring portion 95 of the ring shaped spindle 92 has an internal diameter sized to receive a connection portion 124, 144 of a respective cutter 110 (see FIGS. 2A-2D) or reamer 130 (see FIGS. 2E-2H) (collectively or alternatively referred to as a cutting component 110 or 130) and includes a set screw 97 (see FIGS. 11A-C) to reversibly connect the inner ring portion 95 to the connection portion 124, 144 of a respective cutter 110 or reamer 130.

In the embodiment shown in FIGS. 1, 3-10, and 12-23, the feed mechanism 80 includes a pneumatic actuator 96 and a series of feed gears that are intermeshed to the pinion gear 88 along the length of a slide assembly 100 (a single feed gear 98 is visible, but additional feed gears (not shown) are contained internally within the slide assembly 100) that is partially defined by the mechanism housing 82. The pneumatic actuator 96 utilizes an air-driven piston to rotate the plurality of feed gears, including the feed gear 98, and pinion gear along the length of the slide assembly 100.

The rotation of the feed gears (including feed gear 98) and pinion gear 88 along the length of the slide assembly 100 results in a desired rectilinear movement (i.e., up and down movement) of the spindle 92 as the pinion gear moves along the rack 90 when the pneumatics of the feed mechanism 80 are actuated through the pneumatic actuator 96 by a user/operator, such as through the actuation of a switch or push button (not shown) of the pneumatic actuator 96 to assist in pivoting the feed mechanism 80 about an axis defined by the pin 84.

Figure 24:
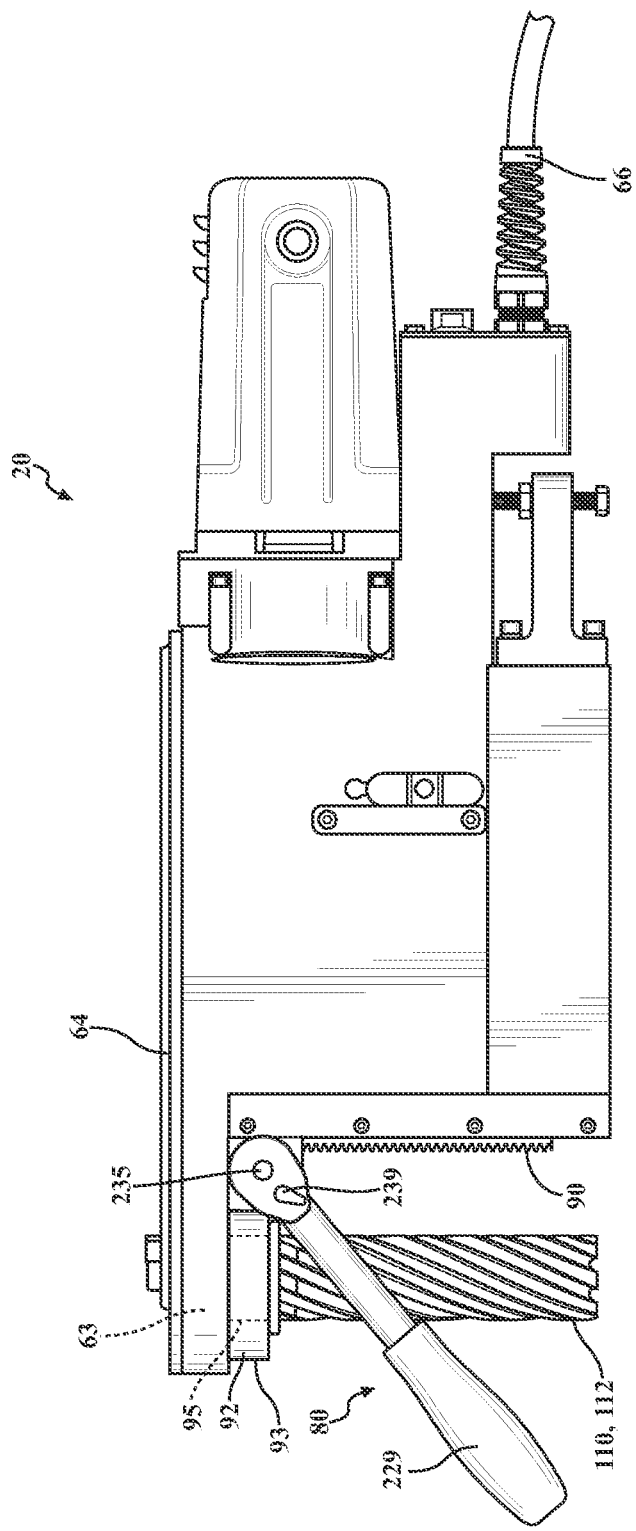
FIG. 24 is a perspective view of a portable drilling assembly in accordance with another exemplary embodiment including a feed mechanism that replaces the pneumatic actuator and associated components with a movable handle and with the portable drilling assembly including the cutter of FIG. 2A in a raised position and after connecting the splined shaft to the gear in the gear housing.
Figure 25:
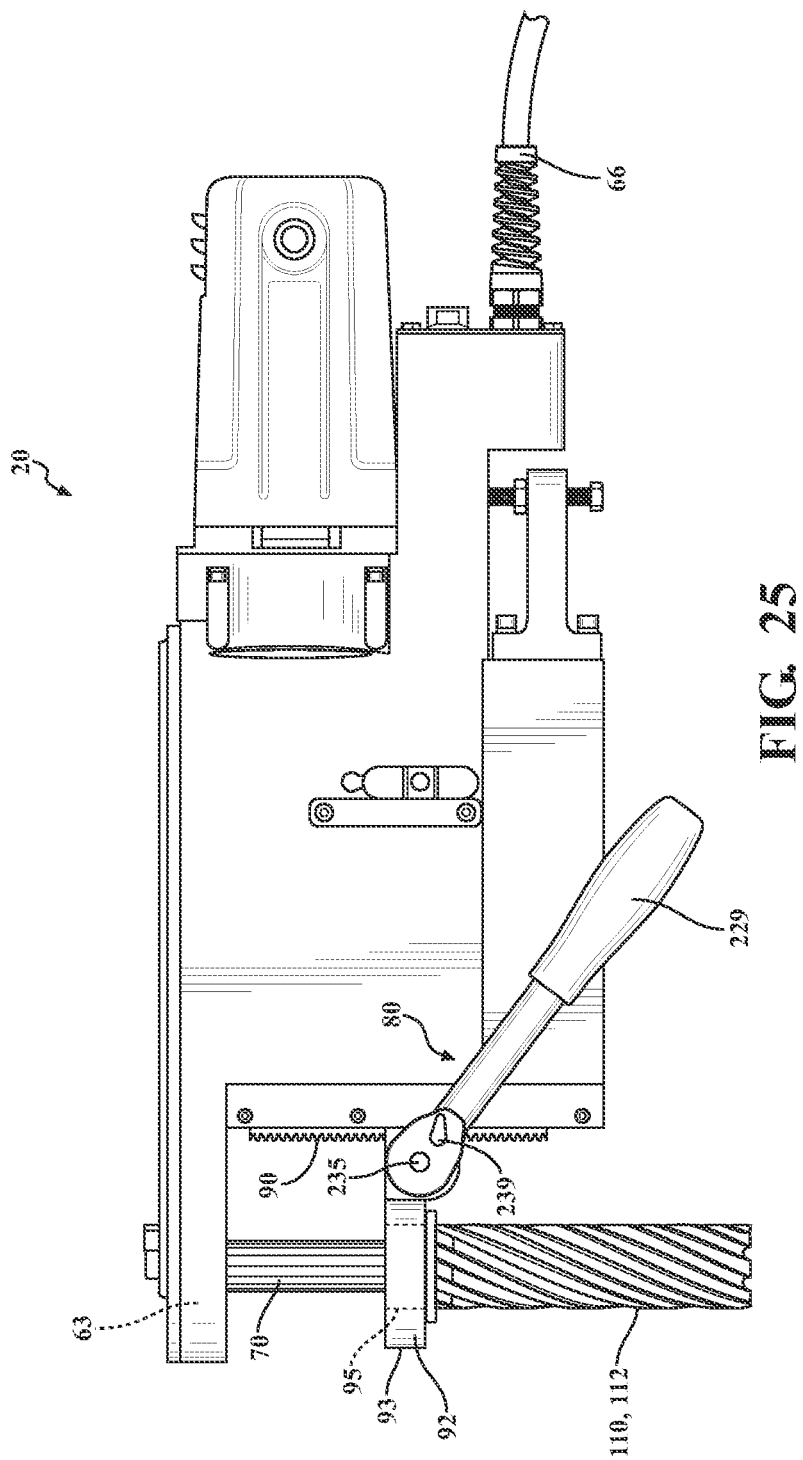
FIG. 25 is a perspective view of the portable drilling assembly of FIG. 24 moved to a lowered position from the raised position and after connecting the splined shaft to the gear in the gear housing.
Figure 26:
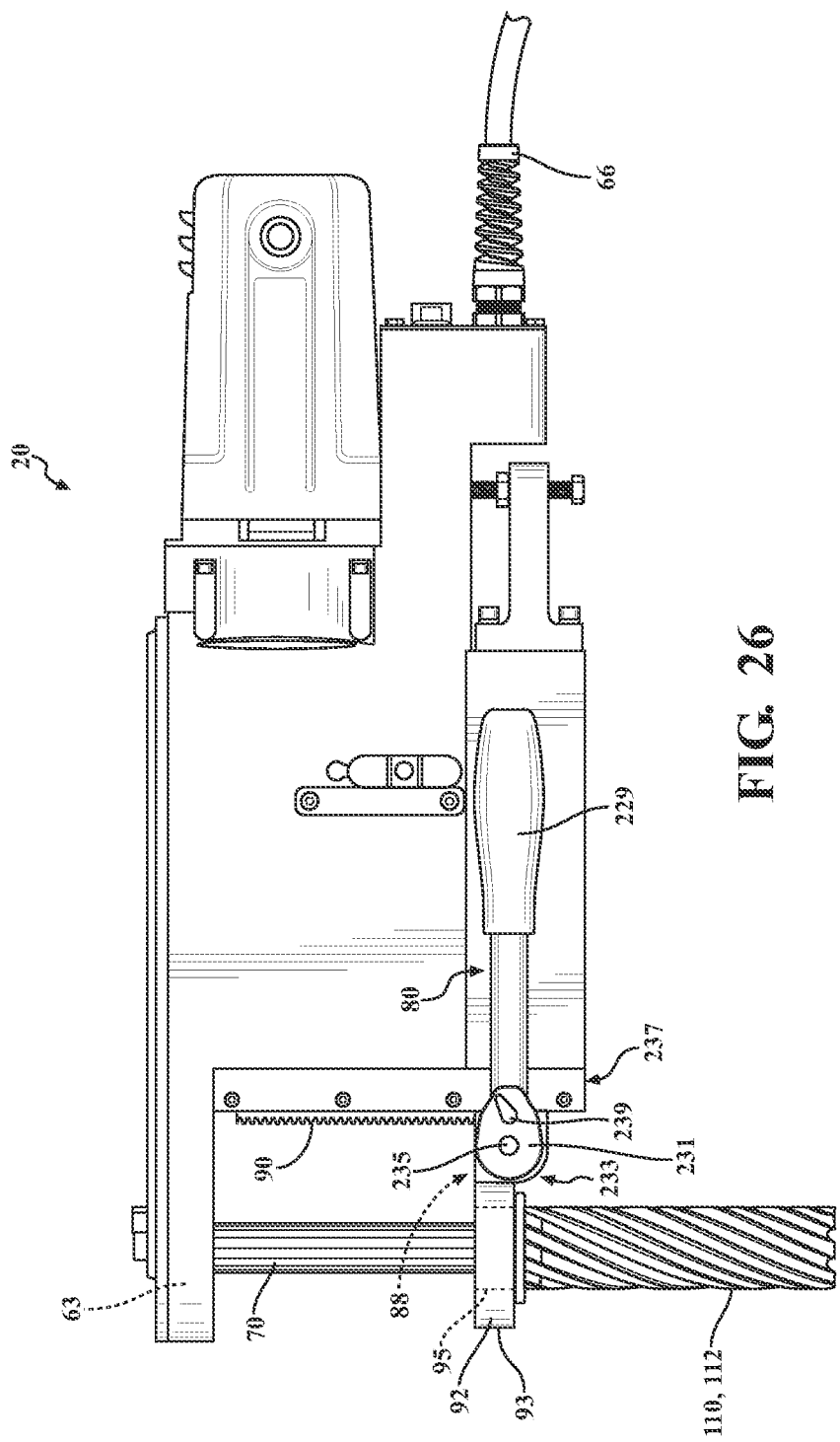
FIG. 26 is a perspective view of the handle of FIGS. 24-26 detached from the remainder of the portable drilling assembly and after connecting the splined shaft to the gear in the gear housing.

In an alternative embodiment, shown in FIGS. 24-26, the feed mechanism 80 does not include the pneumatic actuator 96 and associated feed gears 98 as described above and is instead in the form of a moveable handle 250 that is coupled to the gear box housing 64 or another portion of the drilling assembly 20 and that also includes the pinion gear 88 coupled to the rack 90 as illustrated above. In this embodiment, a user/operator simply applies force to the handle 250 in a direction transverse to the length L of the handle 250 defined between a gripping end 229 and a coupling end 231, thereby allowing the handle 250 to rotate in a first rotational direction or second rotational direction depending upon the direction of force applied, which in turn rotates the coupled pinion gear 88 and corresponding desired rectilinear movement the pinion gear 88 along the rack 90, while also achieving rectilinear movement of the spindle 92 (i.e., up and down movement as shown in FIGS. 24-26) in the same manner as the pneumatic operations of the first embodiment shown in FIGS. 1, 3-10, and 12-23, during a drilling operation. The drilling operations in accordance with the present disclosure therefore utilize either the feed mechanism 80 with the pneumatic system including the pneumatic actuator 96 as shown in the first embodiment shown in FIGS. 1, 3-10, and 12-23, or with movable handle 250, as described in the embodiment of FIGS. 24-26, with each described further below.

In the embodiment of FIGS. 24-26, the coupling end 231 of the handle 250 defines an opening 233 through which a pin 235 extends that pivotally couples the pinion gear 88 to the coupling end 231 of the handle 250 such that the pinion gear 88 freely rotates within the opening 233 about an axis defined by the length of the pin 235 in coordination with the handle 250 as the handle 250 is rotated. The coupling end 231 also defines a secondary opening 237 through which a ratchet mechanism 239 is provided, with the ratchet mechanism pivoting within the secondary opening 237 about an axis defined by the secondary opening 237 between a first ratchet position and a second ratchet position. The ratchet mechanism 239 is pivoted to the first ratchet position (or upward ratchet position) when a user/operator wants to rotate the handle 250 in a first rotational direction such that the spindle 92 and cutting component (i.e., the cutter 110 or reamer 130) moves in a direction away from the working surface 30, while the second ratchet position is utilized when the user/operator wants to rotate the handle 250 such that the spindle 92 and cutting component moves in a direction towards the working surface 30.

Accordingly, the pivoting movement of the handle 250 in a first rotational direction (shown as clockwise movement when comparing the movement shown consecutively in FIGS. 24, 25 and 26) in turn rotates the gear 88, which moves along the rack 90 in coordination with the movement of the spindle 92 away from the working surface 30, and the movement of the spindle 92 away from the working surface 30 in turn moves the coupled cutting component away from the working surface in response. Alternatively, the pivoting movement of the handle 250 in a second rotational direction (i.e., a counterclockwise movement of the handle when comparing the movement shown consecutively in FIGS. 26, 25 and 24) in turn rotates the gear 88, which moves along the rack 90 in coordination with the movement of the spindle 92 towards from the working surface 30, and the movement of the spindle 92 towards the working surface 30 in turn moves the coupled cutting component towards the working surface 30 in response to allow the drilling or reaming of a hole, as will be described further below.

Figure 27:
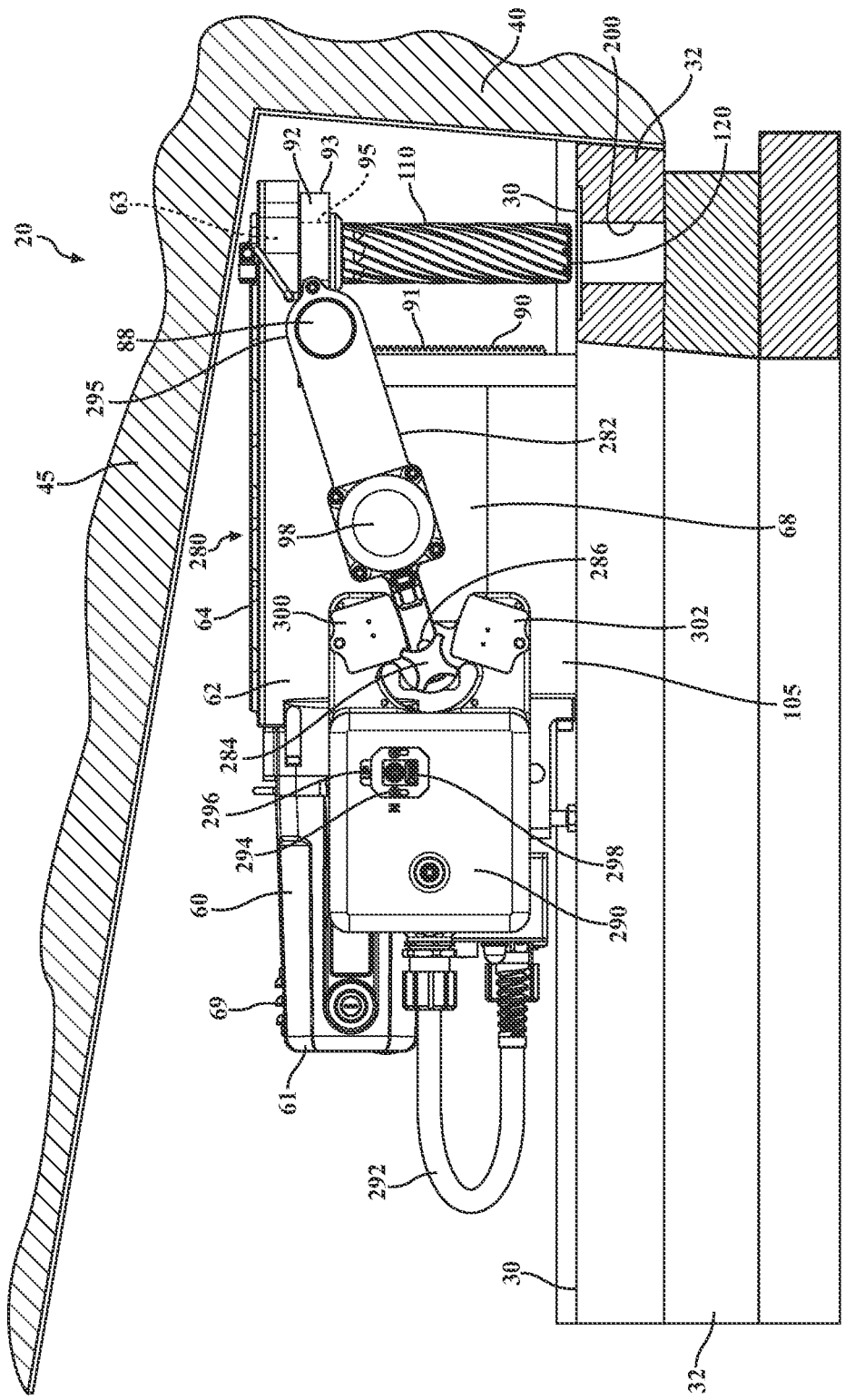
FIG. 27 is a perspective view of a portable drilling assembly in accordance with another exemplary embodiment including a feed mechanism that replaces the pneumatic actuator and associated components with an electric feed mechanism having associated components and with the portable drilling assembly including the cutter of FIG. 2A in a raised position and after connecting the splined shaft to the gear in the gear housing.
Figure 28:
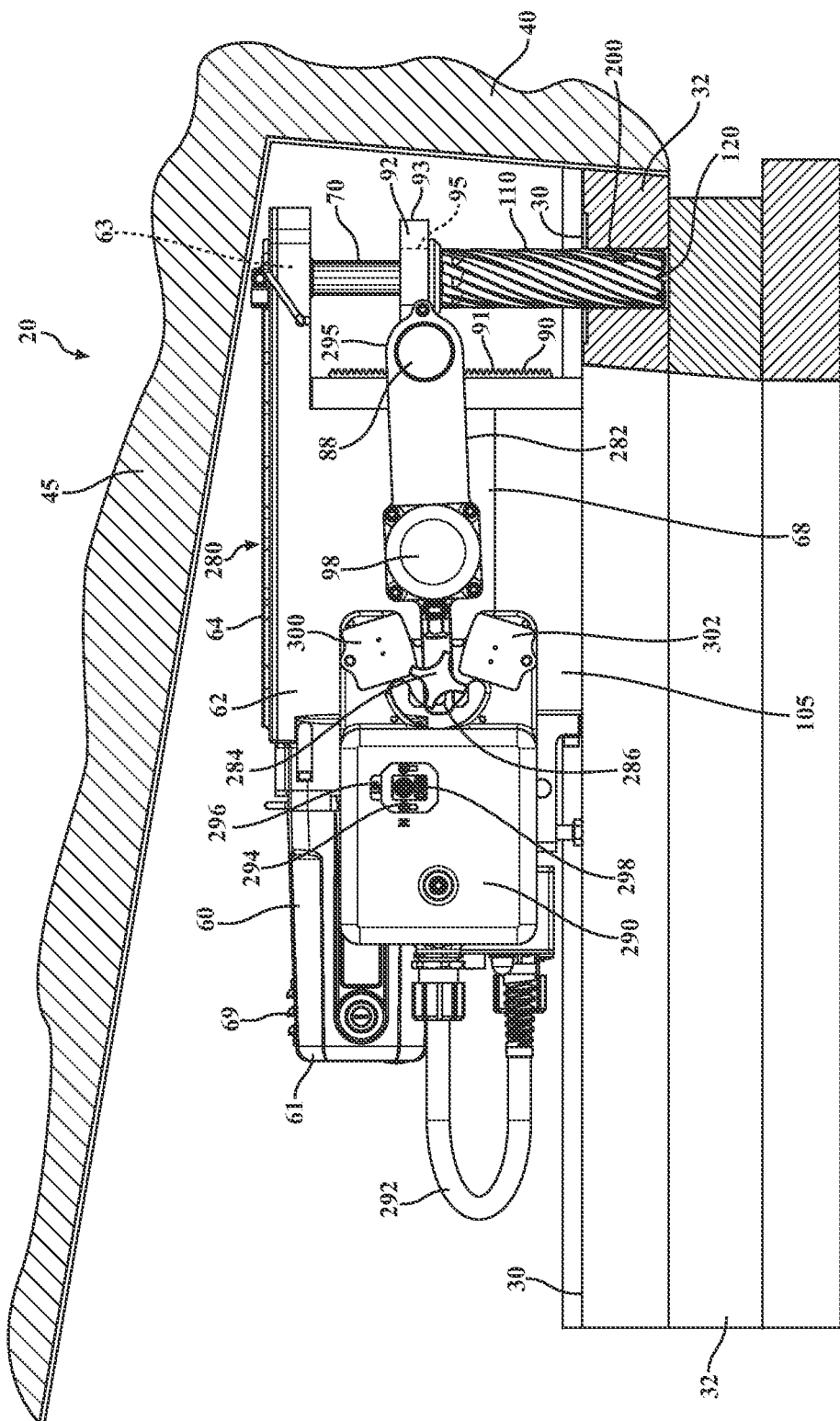
FIG. 28 is a front and close-up perspective view of the portable drilling assembly of FIG. 27 in an intermediate position with the cutter of FIG. 2A positioned within a pilot hole of the working surface.
Figure 29:
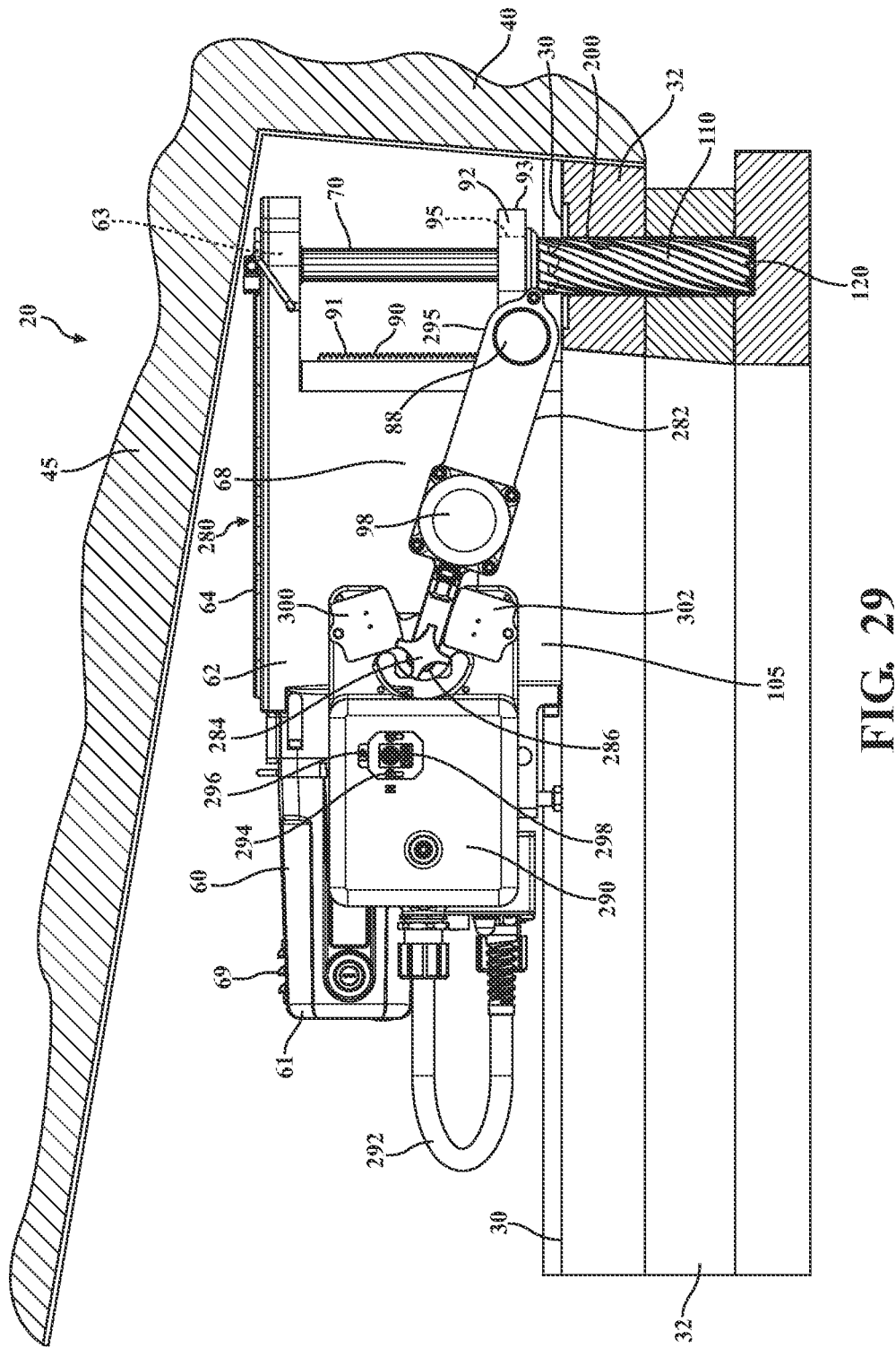
FIG. 29 is a front perspective view of the portable drilling assembly of FIG. 27 in a lowered position with the cutter of FIG. 2A positioned within a drilled hole beneath the pilot hole in the working surface.

In still another alternative embodiment, as shown in FIGS. 27-29 below, the feed mechanism 80 does not include the pneumatic actuator 96 and associated feed gears 98 as described above in FIGS. 1, 3-10, and 12-23 and does not include the manually moveable handle 250 as shown in FIGS. 24-26, but is instead in the form of an electric feed mechanism 280 that also includes the pinion gear 88 coupled to the rack 90 as illustrated above. In this embodiment, as will be described in further detail below, a user/operator simply actuates the electric feed mechanism 280 in a manner that results in the rotation of feed gears, including feed gear 98, and the coupled pinion gear 88 and corresponding desired rectilinear movement the pinion gear 88 along the rack 90, while also achieving rectilinear movement of the spindle 92 (i.e., up and down movement as shown in FIGS. 27-29) in the same manner as the pneumatic operations of the first embodiment shown in FIGS. 1, 3-10, and 12-23 and the manual movement of the handle 250 in second embodiment shown in FIG. 24-26 during a drilling operation.

The drilling assembly 20 also preferably includes a magnetic base 105 coupled to a lower portion 68 of the gear box housing 64. The magnetic base 105 includes an on/off control switch (not shown) that is configured for operation by a user/operator to turn on the magnetic base 105 to generate a magnetic field or turn off the magnetic base 105 to remove the magnetic field.

The drilling assembly 20 also includes one or more cutter splined shaft assemblies 110, or cutters 110 and sometimes referred to as annular cutters 110, and one or more reamer splined shaft assemblies 130, or reamers 130 and sometimes referred to as annular reamers 330, having predefined lengths L1 and L2, respectively, that are used to drill holes of varying depths and diameters in the working surface 30. The cutters 110 and reamers 130, in combination with the splined shaft 70 described above with the interrelationship described in the subject application, may herein be collectively and alternatively be referred to as a "cutter-spline drive".

As best shown in FIGS. 2A-2D, and representative of one non-limiting exemplary embodiment, the drilling assembly 20 includes two cutters 110 having varying lengths L1' and L1", corresponding to a shorter cutter 112 of length L1' (see FIG. 2A) and a longer cutter 114 of length L1" (see FIG. 2D). As also shown in FIGS. 2E-2H and representative of one non-limiting exemplary embodiment, the drilling assembly 20 includes two reamers 130 having varying lengths L2' and L2", corresponding to a shorter reamer 132 of length L2' (see FIG. 2E) and a longer reamer 134 of length L2" (see FIG. 2H). The number of cutters 110 and reamers 130 for interchangeable use in the portable drilling assembly 20 can vary between one and more than one and can vary in length from the cutters 110, 112, 114 and reamers 130, 132, 134 illustrated herein.

As best shown in FIG. 2B, each of the cutters 110, 112, 114 also defines an internal surface 106 that includes splined regions 108 that extend internally along a portion of their respective lengths L1, L1', L1" that are sized and shaped to accept the series of splines 74 of the splined shaft 70 therewithin during use. For ease of illustration, FIG. 2B illustrates a section view of the shorter cutter 112, but the same section could be illustrated from the longer cutter 114 of FIG. 2D. Accordingly, and owing to the presence of internal surface 106 that therefore defines a component cavity contained within the respective cutter 110, 112, 114, each of the cutters 110, 112, 114 may also be referred to alternatively as hollow cutters 110, 112, 114. When the series of splines 74 of the splined shaft 70 are accepted within the internal surface 106 and engage the splined regions 108 to form the cutter-spline drive, the rotation of the splined shaft 70 therefore results in the rotation of the coupled cutter 110, 112, 114 in the same rotational direction.

In addition, the outer surface 116 of the length each of the cutters 110, 112, 114 includes a plurality of helically twisted flutes 118 extending from a bottom end 120 to an intermediate portion 122. Still further, the outer surface 116 of the length each of the cutters 110, 112, 114 also includes a connection portion 124 extending from the intermediate portion 122 to a top end 126. While not illustrated, additional cutters 110 longer than L1" can also be utilized in the subject application.

As one of ordinary still recognizes, the plurality of helically twisted flutes 118 are configured to allow the cutters 110, 112, 114 to be utilized as an initially drilling step to drill a drilled hole in a working surface 30 by allowing drilled material along the outer diameter of the drilled hole to be easily removed as the cutter 110, 112, 114 moves to depths deeper in the work surface 30 than flute designs extending lengthwise and untwisted along the length.

In certain embodiments, as shown in the section view of FIG. 2C, a portion of the internal surface 106 near the bottom end 120 may be substantially smooth and not include the splined regions 108 so as to minimize frictional engagement between the series of splines 74 and the corresponding splined regions 108 and increase the durability of the respective splined shaft 70 and cutter 110, 112, 114 during usage. For ease of illustration, FIG. 2C illustrates a section view of the shorter cutter 112, but the same section could be illustrated from the longer cutter 114 of FIG. 2D.

Similarly, and as illustrated in FIGS. 2E-2H, each of the reamers 130, 132, 134 defines an internal surface 136 that includes splined regions 137 that extend internally along their respective lengths L2, L2', L2" that are sized and shaped to accept the series of splines 74 of the splined shaft 70 therewithin during use. For ease of illustration, FIG. 2F illustrates a section view of the shorter reamer 132, but the same section could be illustrated from the longer reamer 134 of FIG. 2H. Accordingly, and owing to the presence of internal surface 136 that therefore defines a component cavity within respective reamer 130, 132, 134, each of the reamers 130, 132, 134 may also be referred to alternatively as hollow reamers 130, 132, 134. When the series of splines 74 of the splined shaft 70 are accepted within the internal surface 136 to form the cutter-spline drive (i.e., reamer-spline drive), the rotation of the splined shaft 70 therefore results in the rotation of the coupled reamer 130, 132, 134 in the same rotational direction.

However, the outer surface 139 of the length each of the reamers 130, 132, 134 includes a plurality of untwisted and lengthwise extending flutes 138 extending from a bottom end 140 to an intermediate portion 142. Still further, the outer surface 139 of the length each of the reamers 130, 132, 134 also includes a connection portion 144 extending from the intermediate portion 142 to a top end 146. While not illustrated, additional reamers 130 longer than L2" can also be utilized in the subject application. As one of ordinary still recognizes, the use of untwisted and lengthwise extending flutes 138 are configured to allow the reamers 130, 132, 134 to be utilized in a subsequent drilling step in conjunction with a cutter 110 to provide a more precisely circular drilled hole in cross-sectional diameter to the drilled hole provided originally by the cutter.

In certain embodiments, as shown in the section view of FIG. 2G, a portion of the internal surface 136 near the bottom end 140 may be substantially smooth and not include the splined regions 137 so as to minimize frictional engagement between the series of splines 74 and the corresponding splined regions 137 and increase the durability of the respective splined shaft 70 and reamer 130, 132, 134 during usage. For ease of illustration, FIG. 2G illustrates a section view of the shorter reamer 132, but the same section could be illustrated from the longer reamer 134 of FIG. 2H.

In each of the illustrated embodiments, as best shown in respective FIGS. 2B, 2C, 2F and 2G, the respective cross-sectional diameters of the cutters 112, 114 and reamers 132, 134 is the same. However, in embodiments not illustrated, additional cutters 110 and/or reamers 130 having differing cross-sectional diameters from FIGS. 2B, 2C, 2F and 2G are contemplated for use in the drilling assembly 20 of the subject application.

Still further, in each of the illustrated embodiments, while the drawings illustrate the cutting components (i.e., the cutters 110 and/or reamers 130) having a particular illustrated dimension in terms of length L1, L1', L1" or L2, L2', L2" relative to each other and to the size of the components of the drilling assembly 20, such dimensions should not be construed as limiting. Various other lengths of the cutters 110 and/or reamers 130 relative to each other (in combination with additional cross-sectional diameters) and to the components of the drilling assembly 20 are contemplated.

The working surface 30 may be any suitable shape, such as a rectangular shape and is typically made of a ferromagnetic material such as steel. The portable electric drilling assembly 20 is typically mounted and secured to the working surface 30 by magnetic attraction between the magnetic base 105 and the working surface 30. The portable electric drilling assembly 20 may also alternatively be mounted or otherwise secured to the working surface with a clamp or through the use of a vacuum assist. Still further, the portable electric drilling assembly 20 may be mounted or secured to the working surface 30 by magnetic attraction in combination clamping and/or vacuum assist. It should be appreciated that the working surface 30 may be a workpiece, or the workpiece may be supported on the working surface 30. It should also be appreciated that the working surface 30 is not intended to limit the scope of the subject application. It should further be appreciated that the portable electric drilling assembly 20 may be used with various other types of working surfaces without departing from the scope of the subject application.

FIGS. 3-10 and 12-22 illustrate an operational method for utilizing the portable electric drilling assembly 20 of FIG. 1 to drill and subsequently ream a hole into the working surface 30 of a workpiece 32 utilizing the two cutters 112, 114 and two reamers 132, 134 illustrated in FIGS. 2A-2H of the subject application. The operations of FIGS. 3-10 and 12-22 are ideally suited for drilling such holes in workpieces 32 within a confined space 50, although the operation of the drilling assembly 20 in accordance with the description of FIGS. 3-10 and 12-22 can also be performed on workpieces not in a confined space.

In general, during this operational method, when the workpiece 32 is a metal workpiece, the portable electric drilling assembly 20 is disposed on the working surface 30, such as wherein the workpiece 32 is situated in the confined space 50. The user/operator operates a control switch (not shown) to provide power to generate a magnetic field to magnetically mount and secure the magnetic base 105 of the portable electric drilling assembly 20 to the working surface 30. The user/operator actuates the electric motor 60 and the electric motor 60 rotates about a drive axis and rotates the gear 63 contained within the gear housing 64, which in turn rotates the splined shaft 70 quick connected to the gear 63 via the quick connection mechanism 65 within the gear housing 64. At the same time, the intermeshing of the splines 74 of the splined shaft 70 with the splined regions 108 of the internal surface 106 causes the attached cutter 110, 112, 114 (or the intermeshing of the splines 74 of the splined shaft 70 with the splined regions 137 of the internal surface 136 of the attached reamer 130, 132, 134) to rotate in response and drill or ream the hole to a desired cross-sectional diameter. Still further, by pivoting the feed mechanism 80 from a raised position to an intermediate or lowered position, the depth of the drilled or reamed hole can be precisely controlled, with the maximum depth corresponding to the stroke length associated with the pivoting the feed mechanism 80 from a raised position to the lowered position as described further below.

Figures 3A, 3B:
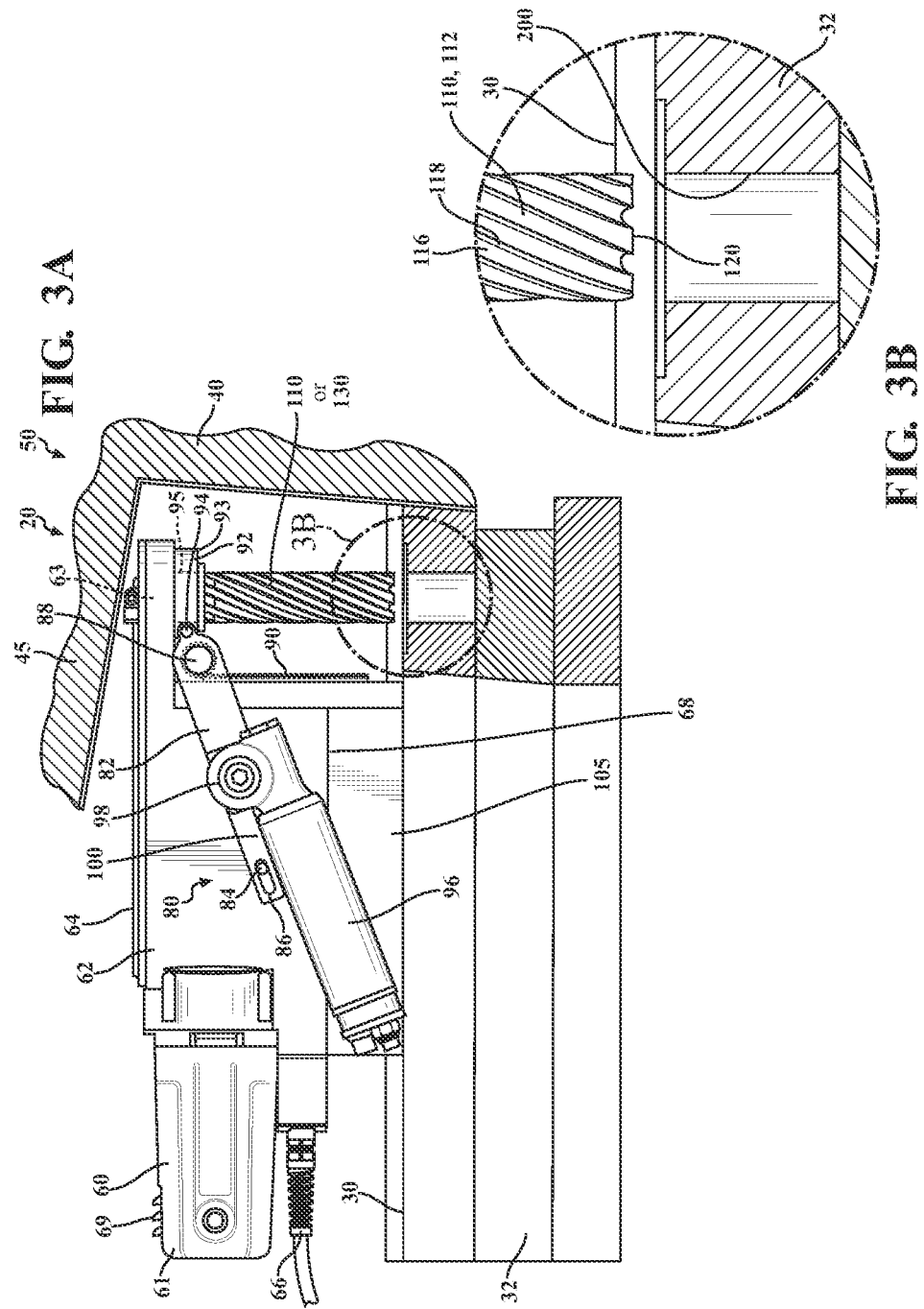
FIG. 3A is a front and close-up perspective view of the portable drilling assembly of FIG. 1 including the cutter of FIG. 2A in a raised position and positioned over a pilot hole predrilled into the working surface of the workpiece to be drilled.
FIG. 3B is a close-up perspective view of the portable drilling assembly of FIG. 3A within circle 3B.

Referring first to FIGS. 3A and 3B, the operational method begins wherein a first cutter 110 (here shown as the smaller cutter 112) is positioned above a pilot hole 200 with the connection portion 124 of the cutter 112 received within the internal diameter of the spindle 92 and with the pivoting feed mechanism 80 positioned in the raised position wherein the spindle 92 is positioned in its closest proximity to the gear 63 and in its furthest proximity from the working surface 30 of the workpiece 32 and pilot hole 200. The pilot hole 200 has been predrilled into the working surface 30 and provides an orientation for guide for the drilling of the hole as provided in the operational method. In this position, the bottom end 120 of the cutter 110, 112, is positioned adjacent to the opening defining the pilot hole 200 at the working surface 30, and the user/operator inserts and tightens the set screw 97 (see FIGS. 11A-C), typically with an Allen wrench, to reversibly couple the connection portion 124 of the cutter 110, 112 to the inner ring portion 95 of the spindle 92. As one of skill appreciates, by loosening the set screw 97, the process of coupling the connection portion 124 of the cutter 110, 112 to the inner ring portion 95 of the spindle 92 can be reversed.

In addition, the splined shaft 70 is quick connected to the gear 63 via the quick connection mechanism 65, as also best shown in FIGS. 11A-11C. In particular, the splined shaft 70 is first aligned with and positioned beneath the gear 63 which includes a quick connect mechanism 65 by the user/operator, as shown in FIG. 11A, by twisting the splined shaft 70 in a clockwise or counterclockwise direction until the splines 74 of the splined shaft 70 are aligned with the internal opening 63A within the gear 63 and with the inwardly extending recessed portion 73 not including the ledge 77 aligned beneath the steel pin 67. Next, as shown in FIG. 11B, the user/operator inserts the turned and milled upper end feature 72 of the splined shaft 70 within the internal opening 63A of the gear 63 by moving the splined shaft 70 towards the gear 63 (shown by arrow 71) such that the turned and milled upper end feature 72 of the splined shaft 70 is contained within the internal opening 63A within the gear 63. Finally, the splined shaft 70 is rotated a quarter turn (shown by arrow 81), thereby positioning the ledge 77 adjacent to and above the quick connect feature 65 (i.e., above the steel pin 67). In this position, the splined shaft 70 cannot be pulled in a direction away from the gear 63 and gear housing 64 towards the working surface 30 because the ledge 77 is prevented from moving by the quick connect mechanism 65, here the steel pin 67. In the connected position, the gear 63 is engaged with the splined shaft 70, and hence the splined shaft 70 rotates as the plurality of gears 63 are rotated.

To disconnect the splined shaft 70 from the quick connect feature 65 and remove the splined shaft 70 from engagement with the gear 63, the user rotates the splined shaft 70 a quarter turn in the opposite direction of arrow 81, at which point the inwardly extending recessed portion 73 is aligned with the steel pin 67 but wherein the ledge 77 is not above the steel pin 67 of the quick connect feature 65, which allows the user/operator to move the splined shaft 70 away from the gear box 64 towards the working surface 30 (i.e., in an opposite direction to arrow 71 shown in FIG. 11B) to the unconnected position as shown in FIG. 11A.

Referring back to FIGS. 3A and 3B, and while not illustrated specifically in these figures, it is understood that a maximum length of the splined shaft 70 (hidden within the cutter 110, 112 as illustrated) is received within the component cavity defined by the internal surface 106 of the cutter 110, 112.

Next, the user/operator operates a control switch (not shown) to provide power to generate a magnetic field to magnetically mount and secure the magnetic base 105 of the portable electric drilling assembly 20 to the working surface 30. The user/operator actuates the electric motor 60 and the electric motor 60 rotates about a drive axis and rotates the gear 63 contained within the gear housing 64, which in turn rotates the splined shaft 70 quick connected to the gear 63 within the gear housing 64. At the same time, the intermeshing of the splines 74 of the splined shaft 70 with the splined regions 108 of the internal surface 106 causes the attached cutter 110, 112 (and inner ring portion 95 contained within the fixed outer portion 93 of the spindle 92) to rotate in response. Stated another way, the rotation of the splined shaft 70 directly drives the rotation of the attached cutter 110, 112 which drives the rotation of the inner ring portion 95.

Figure 5:
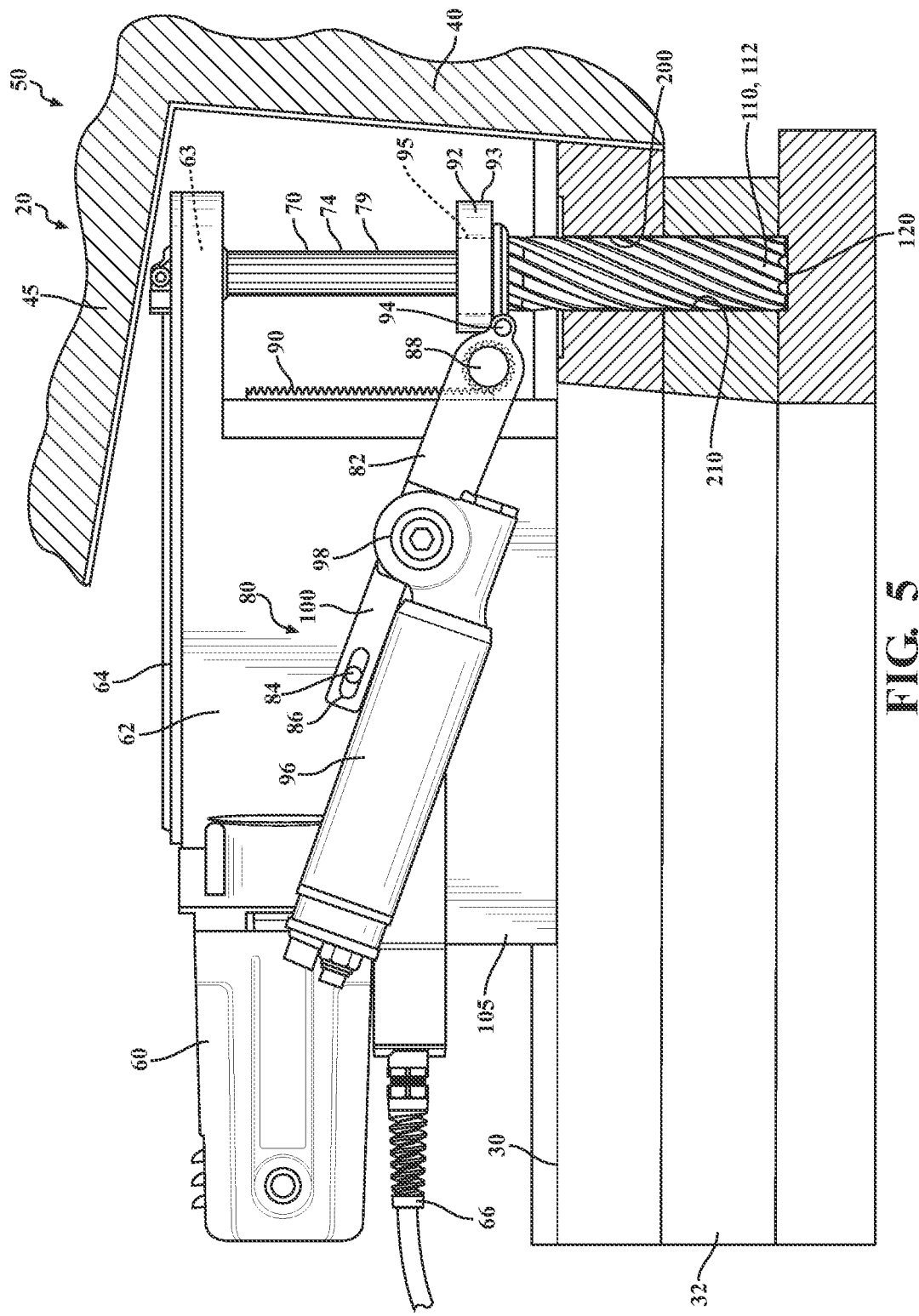
FIG. 5 is a front perspective view of the portable drilling assembly of FIG. 3A in a lowered position with the cutter of FIG. 2A positioned within a drilled hole beneath the pilot hole in the working surface.

Next, as shown in FIGS. 4A-4B and 5, the user/operator pivots the feed mechanism 80 (by actuating the pneumatic actuator 96) from the raised position (as shown in FIGS. 3A and 3B) through an intermediate position (as shown in FIGS. 4A and 4B) to a lowered position (as shown in FIG. 5). The pivoting of the feed mechanism 80 relative to the gear housing 64 is accomplished by actuating the pneumatic actuator 96 to rotate the plurality of feed gears (including feed gear 98) which in turn causes the pinion gear 88 to rotate in response and move in a rectilinear movement away from the gear 63 and towards the working surface 30 (downward as shown in FIG. 4A) while remaining intermeshed with the teeth 91 in the rack 90. The rotation of the cutter 110, 112 (caused by the rotation of the coupled splined shaft 70 and gear 63 rotated by the motor 60) during this movement from the raised position through the intermediate position to the lowered position drills a secondary hole 210 in the workpiece 32 of increasing depth in a direction away from the working surface 30 that is axially aligned with the pilot hole 200 (as best shown in FIG. 4B and FIG. 5). In other words, the relative amount of pivoting of the feed mechanism 80 from the raised position (as shown in FIGS. 3A and 3B) through an intermediate position (as shown in FIGS. 4A-4B) to a lowered position (as shown in FIG. 5) controls the relative depth of the secondary hole 210 drilled.

The depth of the secondary hole 210 beneath the pilot hole 200 is a function of a stroke length of the drilling assembly 20 with the attached cutter 110, 112 pivoted to the lowered position. In particular, the stroke length is defined as the length of movement of the spindle 92 between any two operating positions between and including the raised and lowered positions and may be determined by subtracting the height of the spindle 92 relative to the working surface 30 in a second operating position from the height of the spindle 92 relative to the working surface 30 in a first operating position, with the second operating position of the spindle 92 being closer to the working surface 30 than the first operating position of the spindle 92.

The maximum depth of the secondary hole 210 beneath the pilot hole 200, which is shown in FIG. 5 (or a maximum depth of a tertiary hole 220 as in FIG. 23), may be defined in terms of the maximum stroke length 300 of the drilling assembly 20 that is calculated by subtracting the gearbox height 305, the spindle height 310 and the chip clearance height 315 from the machine height 320 in the lowered position. In this calculation, the machine height 320 is fixed and is defined as the distance between the top of the gear box housing 64 and the working surface. Similarly, the gearbox height 305 is also fixed, and is defined as the distance between the top of the gear box housing and the bottom of the gear box housing 64 associated with portion of the gear box 62 including the quick connection mechanism 65. The spindle height 310 is further defined as the distance between the upper and lower surface of the spindle 92, while the chip clearance height 315 is further defined as the distance between the bottom of the spindle 92 and the working surface 30 of the workpiece 32 in the lowered position.

As also shown in FIG. 5, the positioning of the feed mechanism 80 in the lowered position is such wherein a minimum length of the splined shaft 70 is received within the component cavity defined by the internal surface 106 of the cutter 110, 112, but wherein this minimum length still results in the engagement of the splines 74 of the splined shaft 70 with the corresponding splined regions 108 of the internal surface 106 of the cutter 110, 112, and thus the rotation of the splined shaft 70 results in the rotation of the attached cutter 110, 112 as described above.

Figure 6:
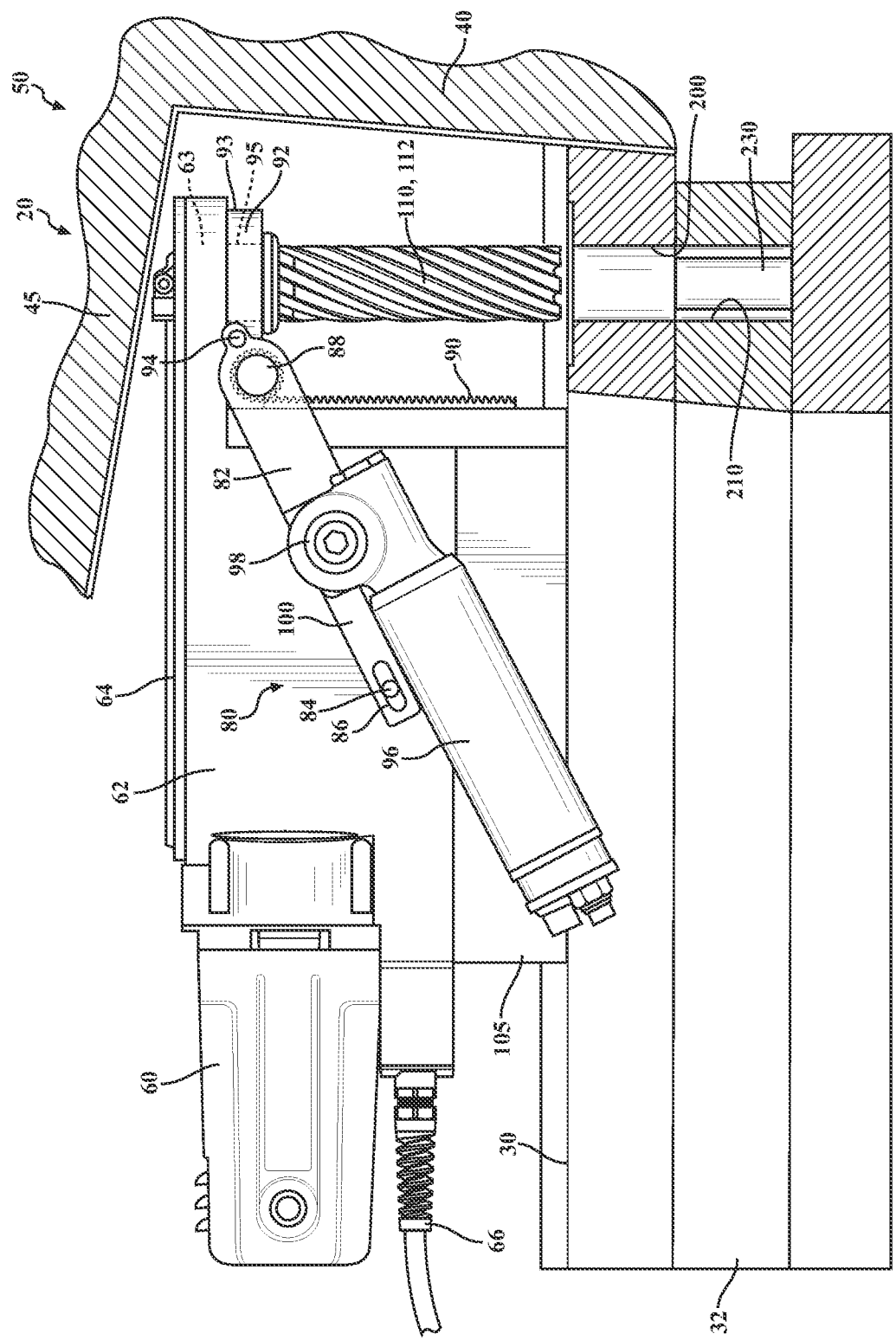
FIG. 6 is a front perspective view of the portable drilling assembly of FIG. 5 in the raised position with the cutter of FIG. 2A positioned above the drilled hole and above the pilot hole in the working surface with a slug remaining in the drilled hole.

Once the drilling assembly 20 reaches the lowered position, as in FIG. 5 and completes the drilling of the secondary hole 210 and corresponding to the maximum stroke 300 in circumstances where the drilling assembly began in the raised position, the user/operator pivots the feed mechanism 80 (by actuating the pneumatic actuator 96) back to the raised position, as shown in FIG. 6. The user/operator then turns off the electric motor 60 and then turns off the magnetic base 105 and moves the drilling assembly 20 away from the drilled secondary hole 210 from the lowered position to the raised position. The cutter 110, 112 can then be uncoupled (i.e., decoupled) from inner ring portion 95 of the spindle 92 by turning the set screw 97, typically using an Allen wrench, such that it is out of contact with the connection portion 124 of the first cutter 112, and the splined shaft 70 may optionally be unconnected from the quick connect mechanism of the gear 63. The first cutter 112 can then be removed from the secondary hole 210.

Figure 7:
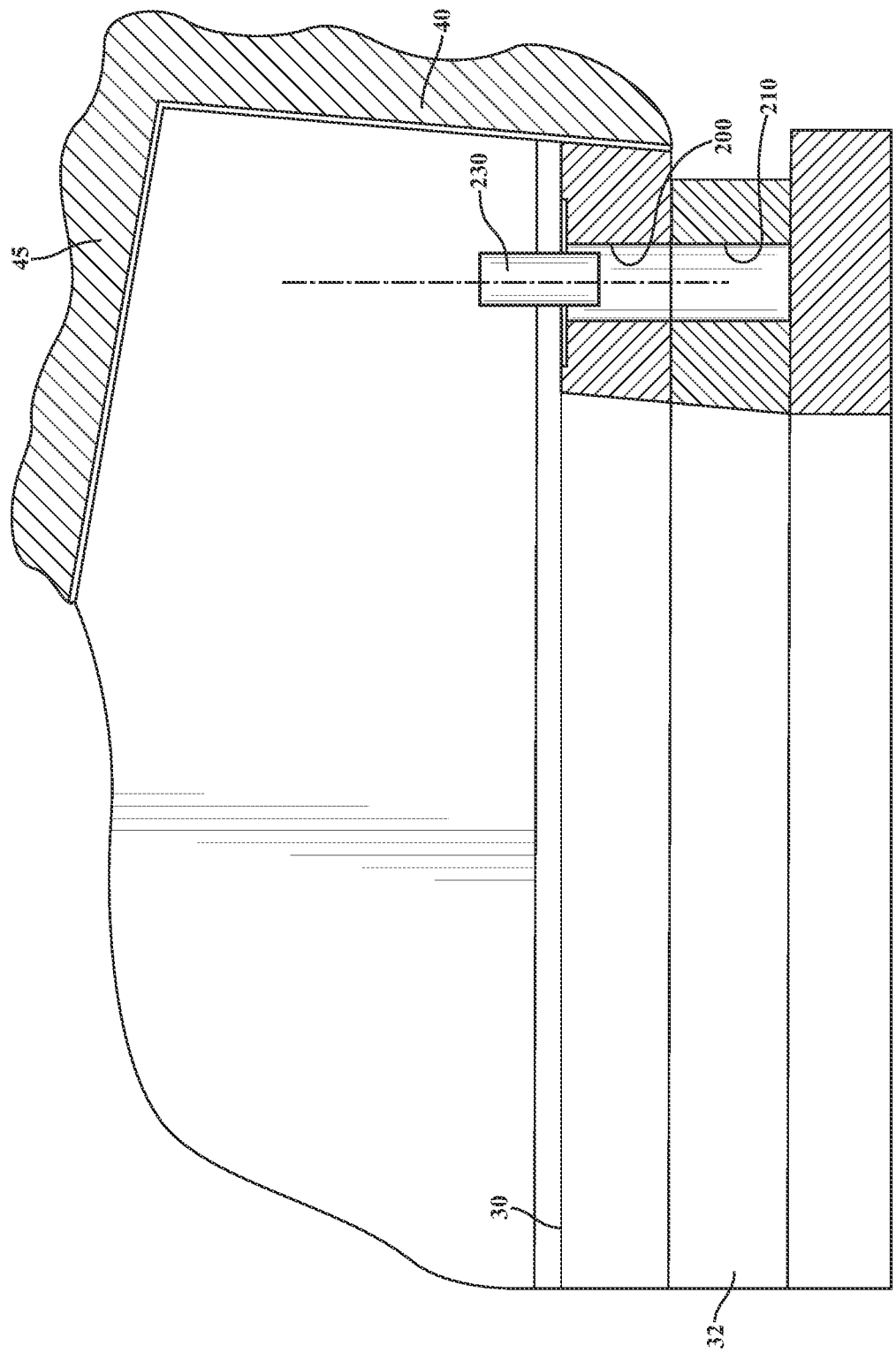
FIG. 7 is a front perspective view of FIG. 6 with the portable assembly removed illustrating the removal of the slug from the drilled hole and pilot hole.

As also shown in FIG. 6, a slug 230 remains within the secondary hole 210 that includes the drilled workpiece 32 material. As shown in FIG. 7, and before or after removal of the first cutter 110, 112 from the spindle 92 but after the movement of the first cutter 110, 112 to a position not within the secondary hole 210 and pilot hole 200, the user/operator removes the slug 230 from the secondary hole 210 through the pilot hole 200.

In operations wherein a deeper hole than the secondary hole 210 is desired in the workpiece 32, the operational method of the subject application may further include a second drilling step, as illustrated in FIGS. 8-12 below.

Figure 8:
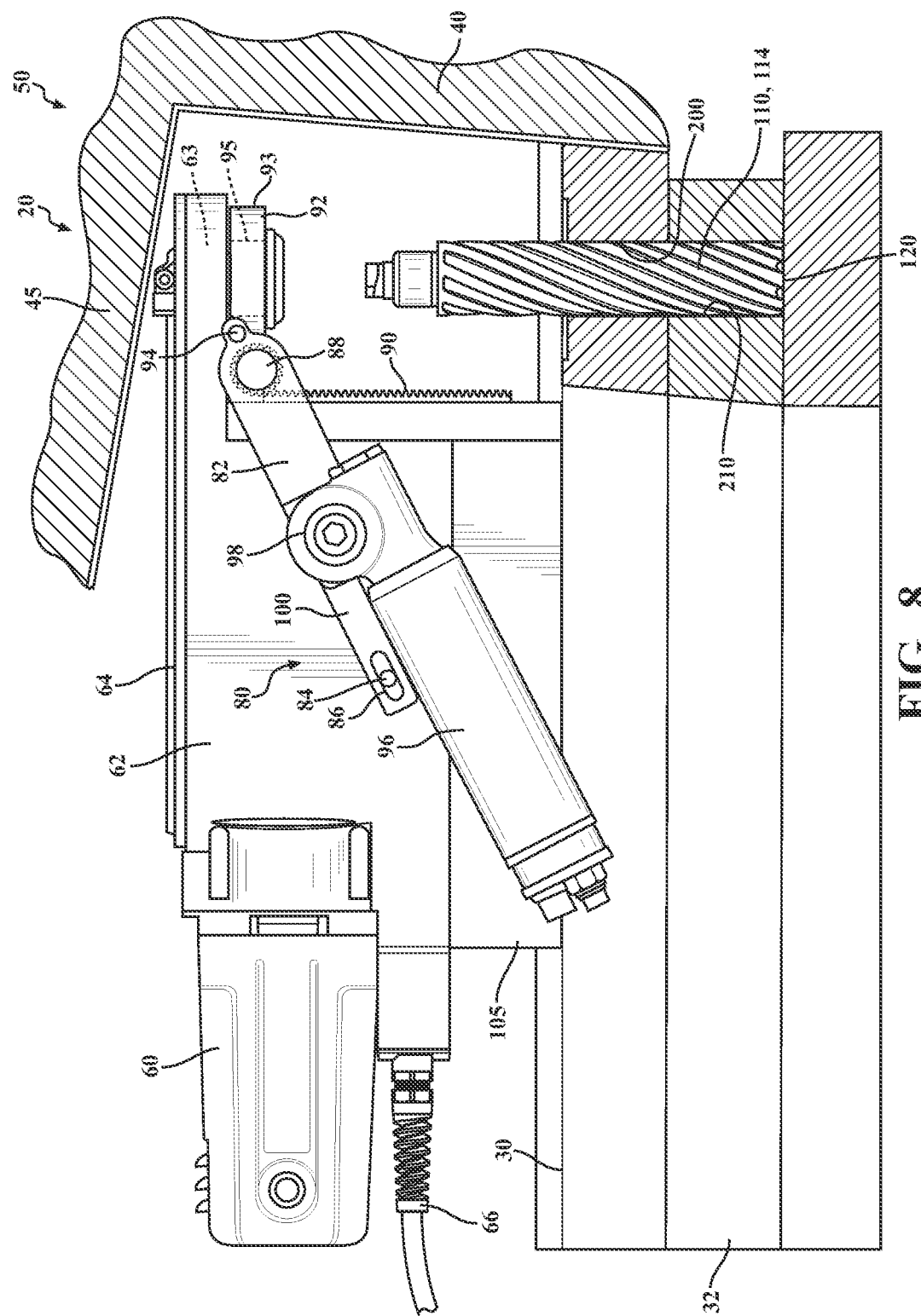
FIG. 8 is a perspective view of the portable drilling assembly of FIG. 6 in the raised position with the cutter of FIG. 2A removed and with the cutter of FIG. 2D positioned within a drilled hole and the pilot hole in the working surface prior to connecting the cutter of FIG. 2A to the spindle and prior to connecting the splined shaft to the gear in the gear housing.

Referring now to FIG. 8, after the first cutter 110, 112 has been decoupled from the drilling assembly 20 and removed from the drilled secondary hole 210, as described above in FIGS. 5 and 6, a second cutter 110, 114, here shown as the longer cutter 114, is positioned within the secondary hole 210 with the bottom end 120 seated at the bottom 211 of the secondary hole 210 and with the connection portion 124 exposed and spaced beneath the spindle 92, which has preferably been raised along with the feed mechanism 80 to a raised position or to an additional intermediate position above the lowered position.

During and preferably prior to this positioning of the second cutter 110, 114 in the secondary hole 210, the user/operator raises the splined shaft 70 such that it can be quick connected to the gear 63 via the quick connection mechanism 65 in the same manner described above with respect to FIG. 3A and FIG. 11.

Notably, the maximum length of the second cutter 114 that can be introduced as illustrated in FIG. 8 when the drilling assembly 20 is in the raised position is limited by the distance between the bottom end 76 of the splined shaft 70 and the bottom 211 of the secondary hole 210 when the splined shaft 70 is coupled the internal quick connector wherein the milled upper end feature 72 of the splined shaft is coupled to, and rotatable with, the gear 63.

After positioning, a user operator manually raises the second cutter 114 such that the connection portion 124 is received within the inner ring portion 95 of the ring shaped spindle 92 which has previously been positioned in an additional intermediate or raised position above the lowered position, where the user turns the set screw 97, typically using an Allen wrench, to connect (i.e., reversibly couple) the inner ring portion 95 to the connection portion 124 of the second cutter 114. While the second cutter 114 is being raised, the bottom end 76 of the splined shaft 70 is received within the second cutter such that the splines 74 are accepted within the internal surface 106 and intermeshed with the splined regions 108.

Figure 9:
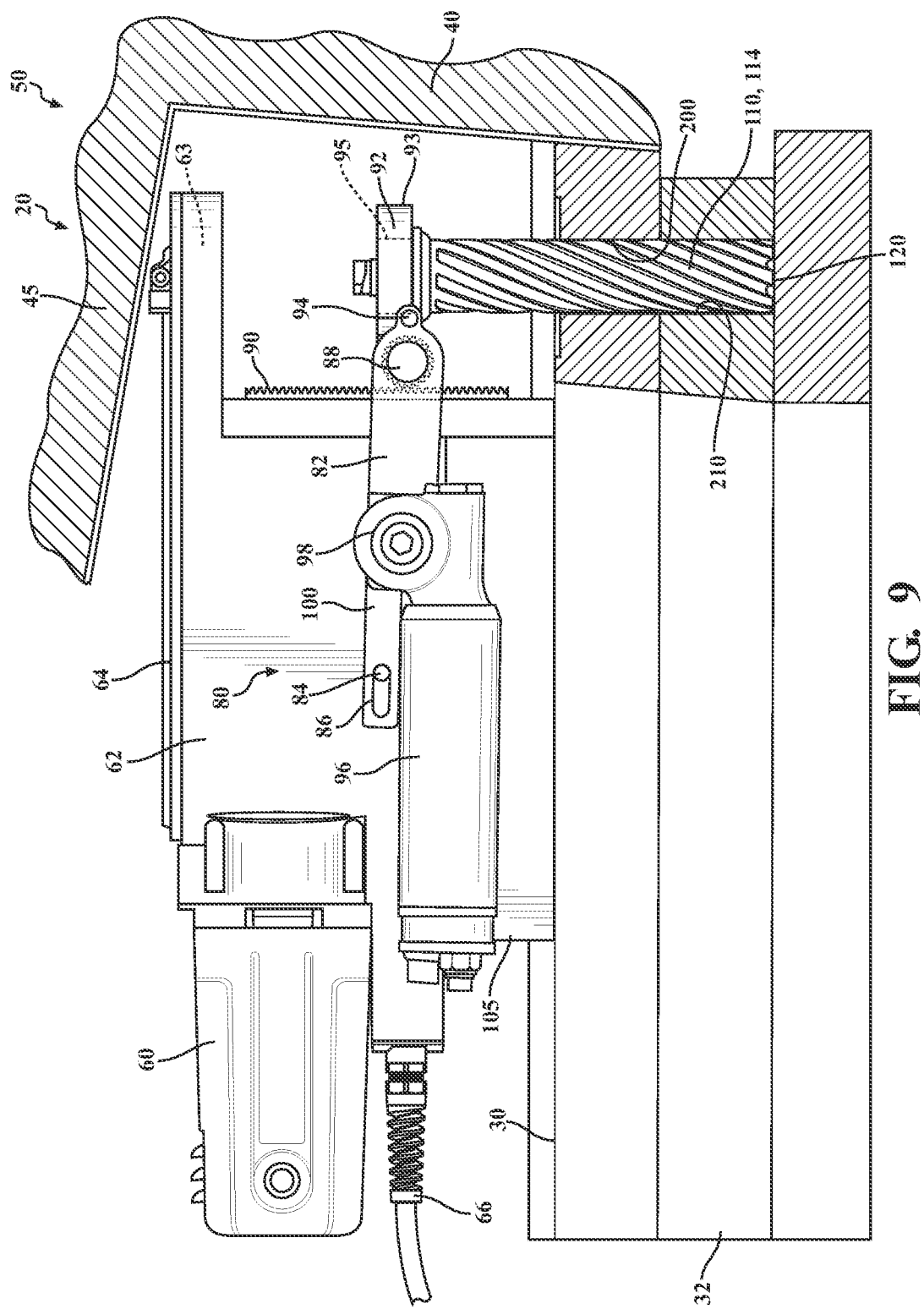
FIG. 9 is a perspective view of the portable drilling assembly of FIG. 8 in an intermediate position with the cutter of FIG. 2D positioned within a drilled hole and the pilot hole in the working surface after connecting the cutter of FIG. 2D to the spindle and prior to connecting the splined shaft to the gear in the gear housing.

In certain embodiments, as illustrated in FIG. 9 and after coupling the second cutter 114 to the inner ring portion 95 in the raised position, the user/operator pivots the feed mechanism 80 (by actuating the pneumatic actuator 96) from the raised position to an additional intermediate position. In this additional intermediate position, the tip end 120 of the cutter 110, 114 is positioned within the secondary hole 210 while maintaining an intermediate length portion of the length of the splined shaft 70 including the splines 74 in engagement with the splined regions 108 of the internal surface 106 of the second cutter 110, 114.

Figure 10:
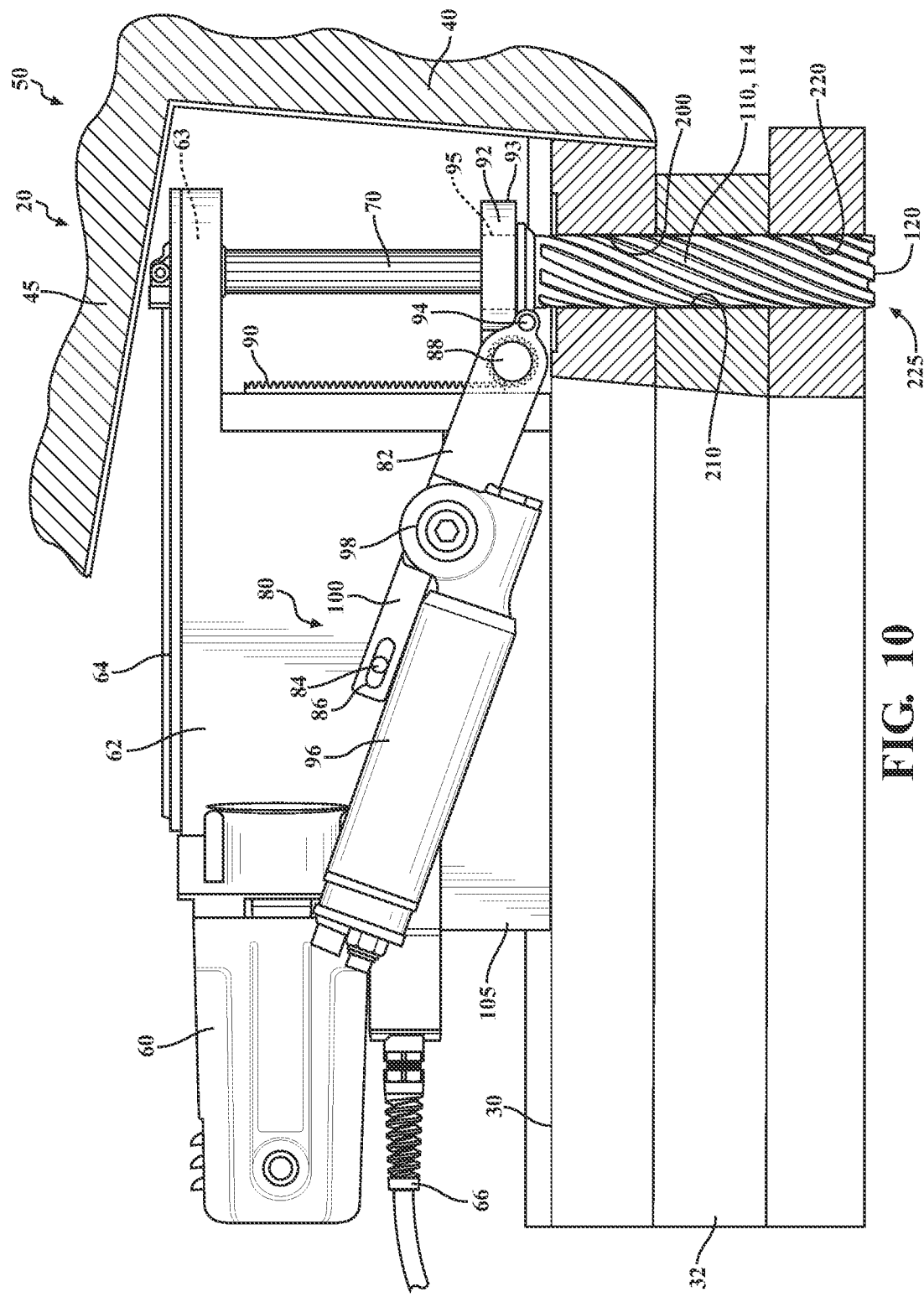
FIG. 10 is a perspective view of the portable drilling assembly of FIG. 9 moved to the lowered position within a further drilled hole in the working surface of the workpiece.

Next, as illustrated in FIG. 10, the user/operator provides power to generate a magnetic field to magnetically mount and secure the magnetic base 105 of the portable electric drilling assembly 20 to the working surface 30. The user/operator actuates the electric motor 60 and the electric motor 60 (i.e., reactivates the motor 60) rotates about a drive axis and rotates the gear 63 contained within the gear housing 64, which in turn rotates the splined shaft 70 quick connected to the gear 63 within the gear housing 64. At the same time, the intermeshing of the splines 74 of the splined shaft 70 with the splined regions 108 of the internal surface 106 causes the attached cutter 110, 114 to rotate in response. Stated another way, the rotation of the splined shaft 70 directly drives the rotation of the attached cutter 110, 114.

Next, the user/operator pivots the feed mechanism 80 (by actuating the pneumatic actuator 96) from the additional intermediate position (as shown in FIG. 9) to a lowered position (as shown in FIG. 10) with the motor 60 activated. The actuator of the pneumatic actuator causes the pinion gear 88 to rotate and move in a rectilinear movement away from the gear 63 along the rack 90 and towards the working surface 30 (downward as shown in FIG. 10) while remaining intermeshed with the teeth 91 in the rack 90. The rotation of the cutter 110, 114 during this movement from the intermediate position to the lowered position drills a tertiary hole 220 in the workpiece 32 of increasing depth in a direction away from the working surface 30 that is axially aligned with and beneath the pilot hole 200 and secondary hole 210 (as shown in FIG. 10). In certain instances, as also shown in FIG. 10, the drilling results in the tertiary hole 220 breaking through the bottom surface of the workpiece 32, therein forming a breakout opening 225.

Figure 12:
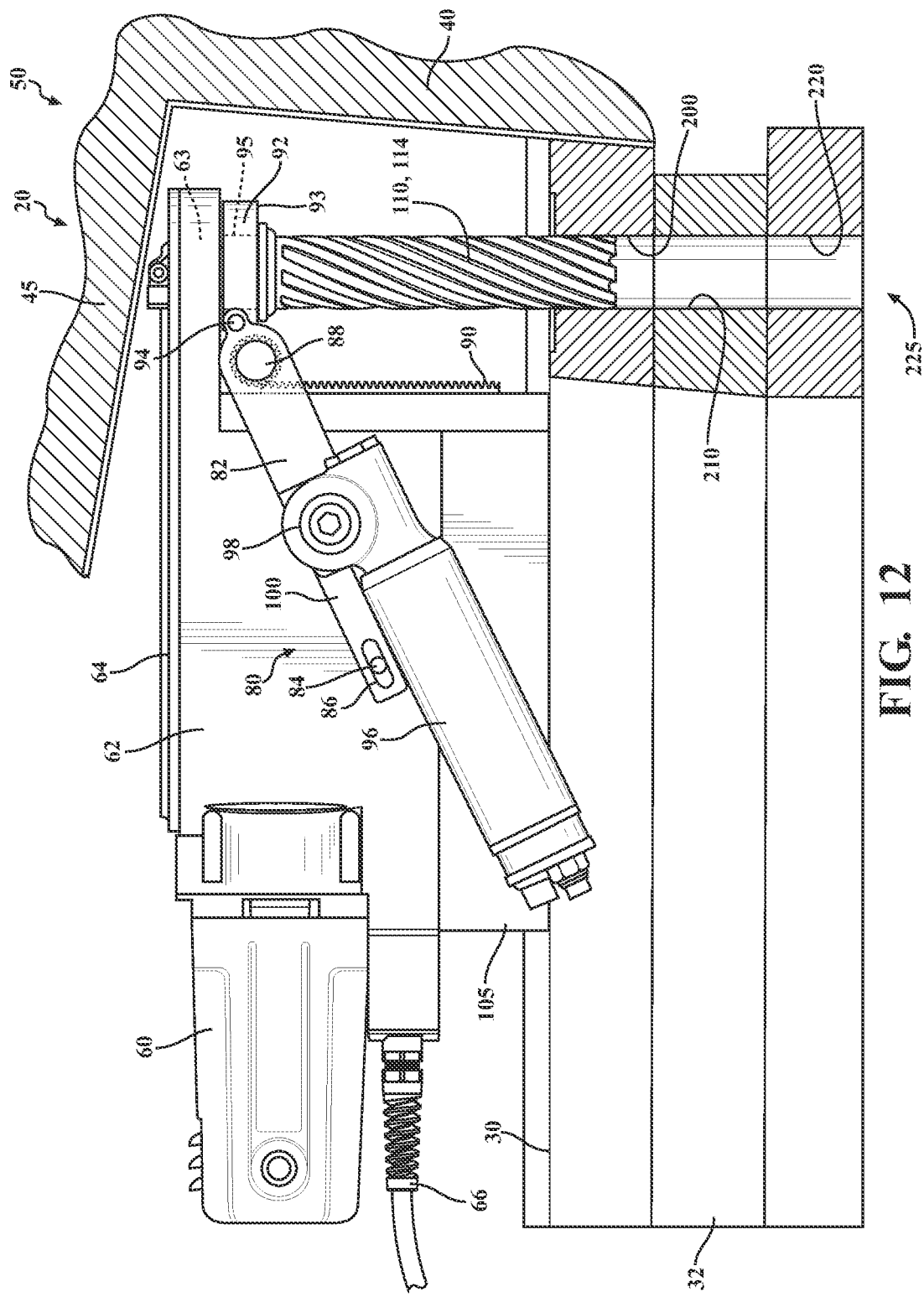
FIG. 12 is a perspective view of the portable drilling assembly of FIG. 9 moved to the raised position within the further drilled hole present in the working surface of the workpiece.

Once the drilling assembly 20 reaches the lowered position, as in FIG. 10 and completes the drilling of the tertiary hole 220, the user/operator pivots the feed mechanism 80 (by actuating the pneumatic actuator 96) back to the raised position, as shown in FIG. 12. The user/operator then turns off the electric motor 60 (i.e., deactivates the electric motor 60), and then turns off the magnetic base 105, and optionally moves the drilling assembly 20 away from the drilled tertiary hole 220. The splined shaft 70 is unconnected from the quick connect mechanism of the gear 63, and the cutter 110, 114 can then be uncoupled from the spindle 92. Any additional slug (not shown) may be removed from the tertiary hole 220 by the user/operator, or the slug may drop out through the breakout opening 225 if formed.

Notably, the difference in depth between the secondary hole 210 and the tertiary hole 220 beneath the working surface 30 corresponds to the difference in length between the first cutter 112 and the second cutter 114 (i.e., the difference between L1' and L1", with the assumption that the drilling device 20 has been moved to the lowered position in each respective drilling operation used to form the secondary hole 210 and tertiary hole 220).

While the process as illustrated in the exemplary embodiment of the operational method as illustrated in FIGS. 3-10 is illustrated in which two different length cutters 112, 114 are used to drill the secondary hole 210, the process is not limited to the use of two cutters 112, 114. In particular, additional cutters 110 of longer lengths than the second cutter 114 may be used to increase the depth the secondary hole 210 and/or tertiary hole 220 beneath the working surface 30 as desired while repeating the process as described the method associated with FIGS. 8-10 above. Still further, cutters 110 having lengths between the lengths of the first and second cutter 112, 114 may be used to drill hole having a depth between the illustrated secondary hole 210 and tertiary hole 220 as illustrated in the Figures herein.

Accordingly, the maximum depth of the secondary hole 210 and/or the tertiary hole 220 beneath the working surface 30, as drilled by the series of cutters 110 as described in the method of FIGS. 3-10, is ultimately a function of the length of the longest respective cutter 110, 112, 114 utilized to drill the secondary hole 210, with the maximum depth determined when the portable drilling assembly 20 is positioned in the lowered position.

Even still further, additional cutters 110 having larger cross-sectional diameters than the first cutter 112 and the second cutter 114 may be used to increase diameter the secondary hole 210 and/or tertiary hole 220 beneath the working surface 30 as desired while repeating the process as described the method associated with FIGS. 8-10 above In operations wherein the secondary hole 210 and/or the tertiary hole 220 of the workpiece 32 is required to have a reamed inner surface (corresponding to a desired final inner diameter), and in certain instances smoother reamed inner surface, than is provided by the cutter 110, 112, 114, the operational method of the subject application may further include further one or two additional reaming steps utilizing the smaller and larger reamers 132 and 134, as illustrated in FIGS. 13-22 below.

Figure 13B:
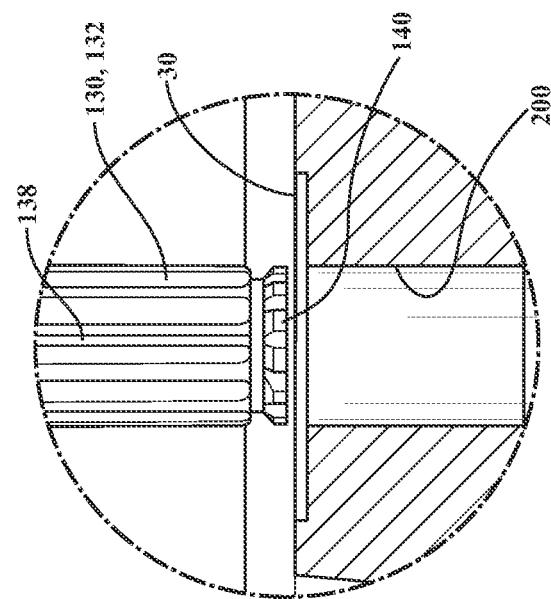
FIG. 13B is a close-up perspective view of the portable drilling assembly of FIG. 13A within circle 13B.
Figure 13A:
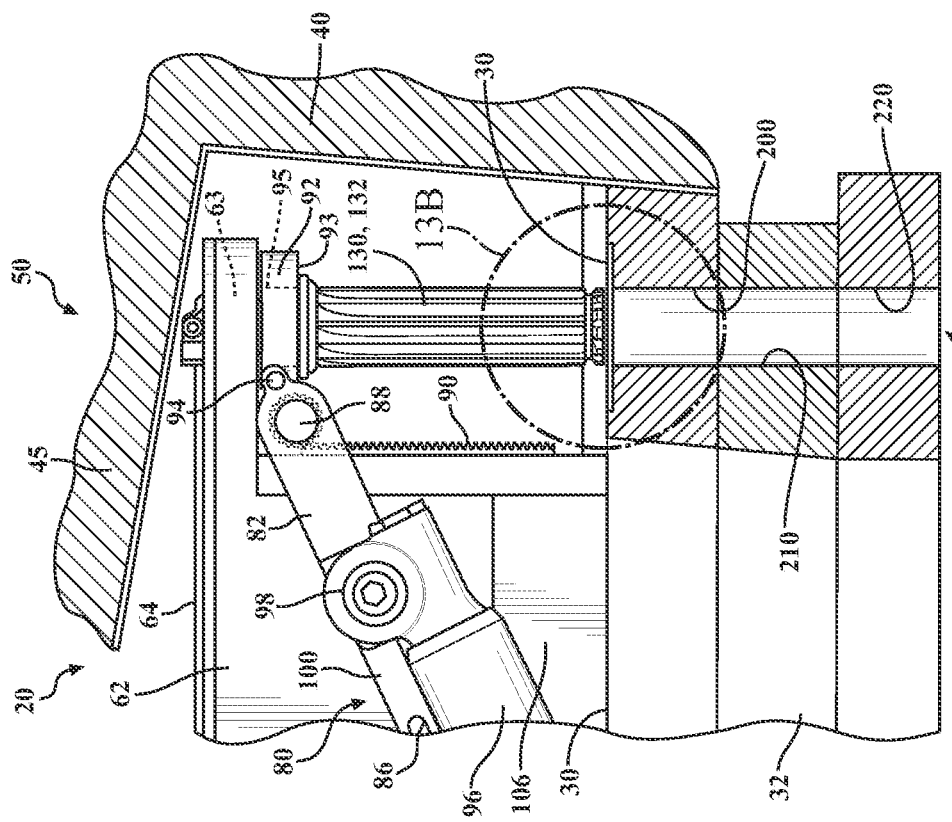
FIG. 13A is a front and close-up perspective view of the portable drilling assembly of FIG. 12 in the raised position with the reamer of FIG. 2E coupled to the spindle and positioned above the pilot hole and further drilled hole of the working surface.

Referring first to FIGS. 13A and 13B, the operational method begins wherein a first reamer 130 (here shown as the smaller reamer 132) is positioned above the pilot hole 200 with the connection portion 124 of the reamer 132 received within the internal diameter of the spindle 92 and with the pivoting feed mechanism 80 positioned in the raised position wherein the spindle 92 is positioned in its closest proximity to the gear 63 and in its furthest proximity from the working surface 30 of the workpiece 32 and pilot hole 200. In this position, the bottom end 140 of the reamer 130, 132, is positioned adjacent to the opening defining the pilot hole 200 at the working surface 30, and the user/operator inserts and tightens a set screw 97, typically with an Allen wrench, to reversibly couple the reamer 130, 132 to the spindle 92 in the same manner as coupling the cutter 110, 112, 114 as described above. In addition, the splined shaft 70 is quick connected to the gear 63 via the quick connection mechanism 65 according to the procedure described above in FIG. 3A and FIG. 11.

Next, the user/operator operates a control switch (not shown) to provide power to generate a magnetic field to magnetically mount and secure the magnetic base 105 of the portable electric drilling assembly 20 to the working surface 30. The user/operator actuates the electric motor 60 (i.e., reactivates the motor 60) and the electric motor 60 rotates about a drive axis and rotates the gear 63 contained within the gear housing 64, which in turn rotates the splined shaft 70 quick connected to the gear 63 within the gear housing 64. At the same time, the intermeshing of the splines 74 of the splined shaft 70 with the splined regions 137 of the internal surface 136 causes the attached reamer 130, 132 to rotate in response. Stated another way, the rotation of the splined shaft 70 directly drives the rotation of the attached reamer 130, 132.

Figure 14B:
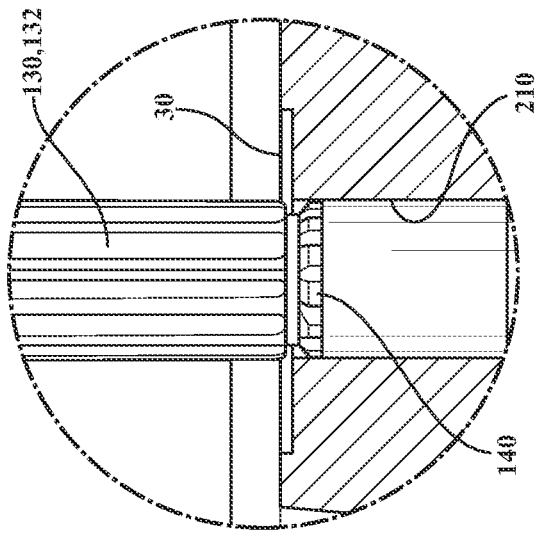
FIG. 14B is a close-up perspective view of the portable drilling assembly of FIG. 14A within circle 14B.
Figure 14A:
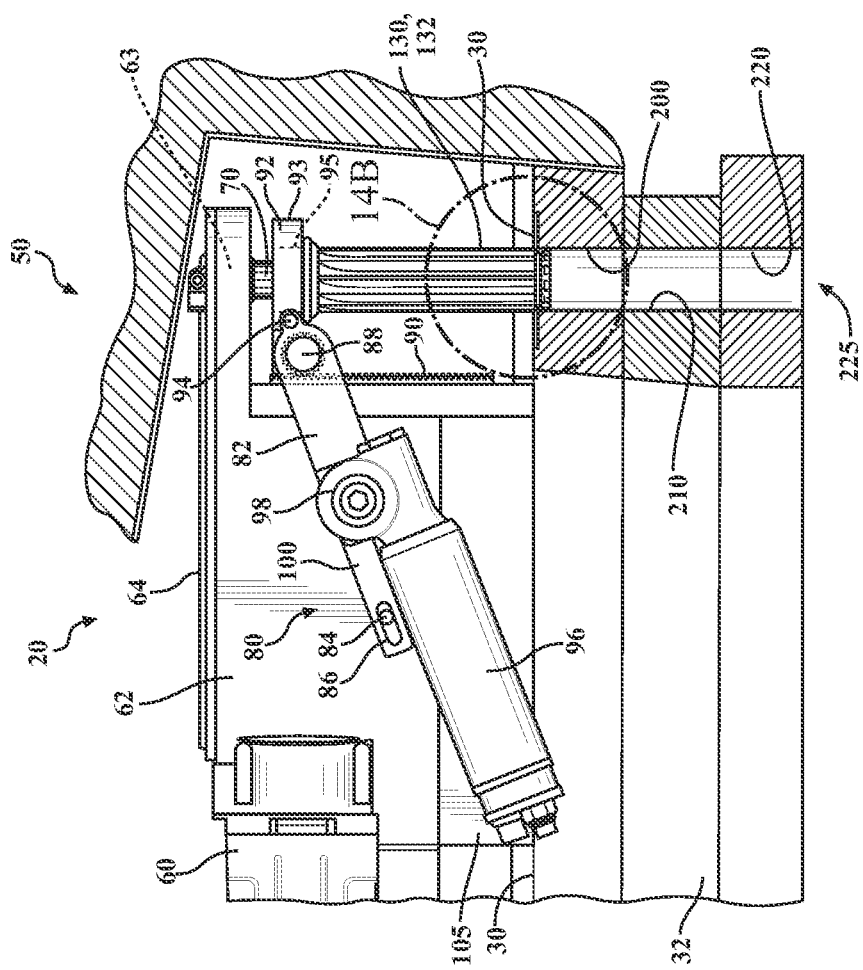
FIG. 14A is a front and close-up perspective view of the portable drilling assembly of FIG. 13A in an intermediate position with the reamer of FIG. 2E coupled to the spindle and positioned to be extending within the pilot hole of the working surface.
Figure 15:
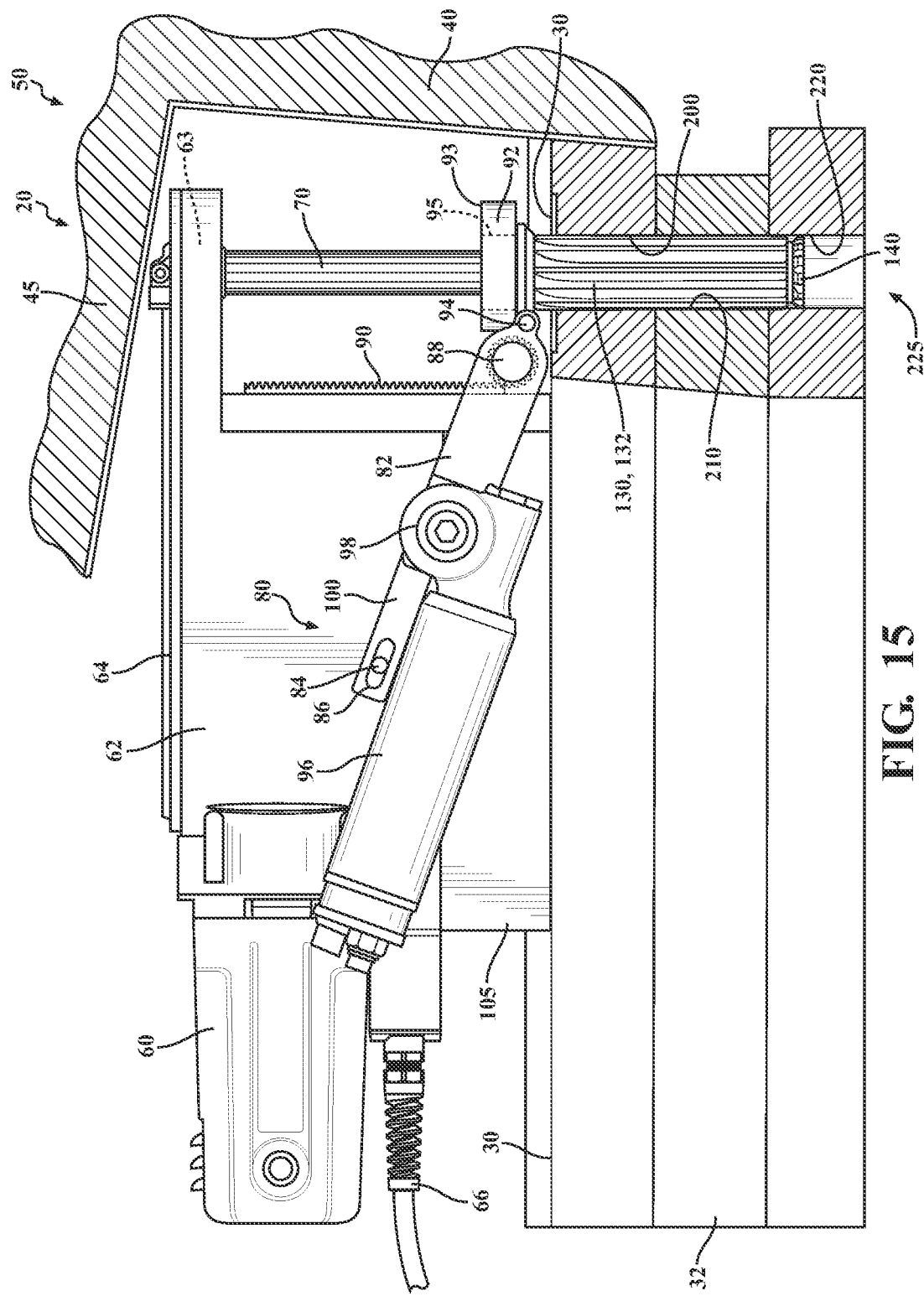
FIG. 15 is a front and close-up perspective view of the portable drilling assembly of FIG. 14A in the lowered position with the reamer of FIG. 2E coupled to the spindle and positioned to be extending within the reamed pilot hole and the further reamed and drilled hole of the working surface.

Next, as shown in FIGS. 14A, 14B and 15, the user/operator pivots the feed mechanism 80 (by actuating the pneumatic actuator 96) from the raised position (as shown in FIGS. 13A and 13B) through an intermediate position (as shown in FIGS. 14A and 14B) to a lowered position (as shown in FIG. 15). The actuation of the pneumatic actuator 96 causes the pinion gear 88 to rotate and move in a rectilinear movement away from the gear 63 along the rack 90 and towards the working surface 30 (downward as shown in FIG. 14) while remaining intermeshed with the teeth 91 in the rack 90. The rotation of the reamer 130, 132 during this movement from the raised position through the intermediate position to the lowered position reams the pilot hole 200 and the secondary hole 210 and possibly a portion of the tertiary hole 220 in the workpiece 32 to provide a reamed interior surface to form the reamed pilot hole 200A and reamed secondary hole 210A and reamed tertiary hole 220A (see FIG. 16).

Figure 16:
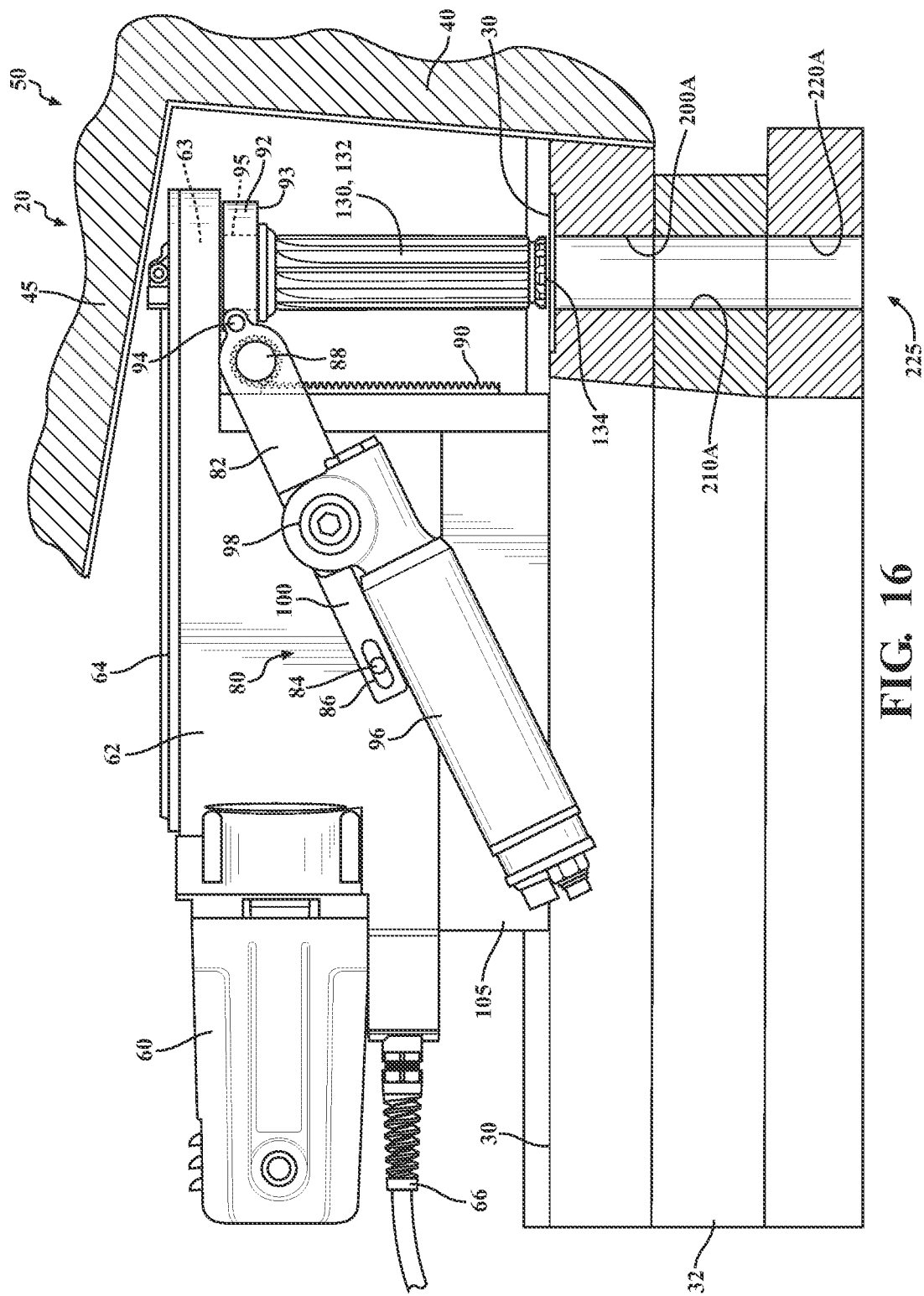
FIG. 16 is a front and close-up perspective view of the portable drilling assembly of FIG. 15 returned to the raised position from the lowered position with the reamer of FIG. 2E coupled to the spindle and positioned to be extending above the reamed pilot hole and the further reamed and drilled hole of the working surface.
Figure 17:
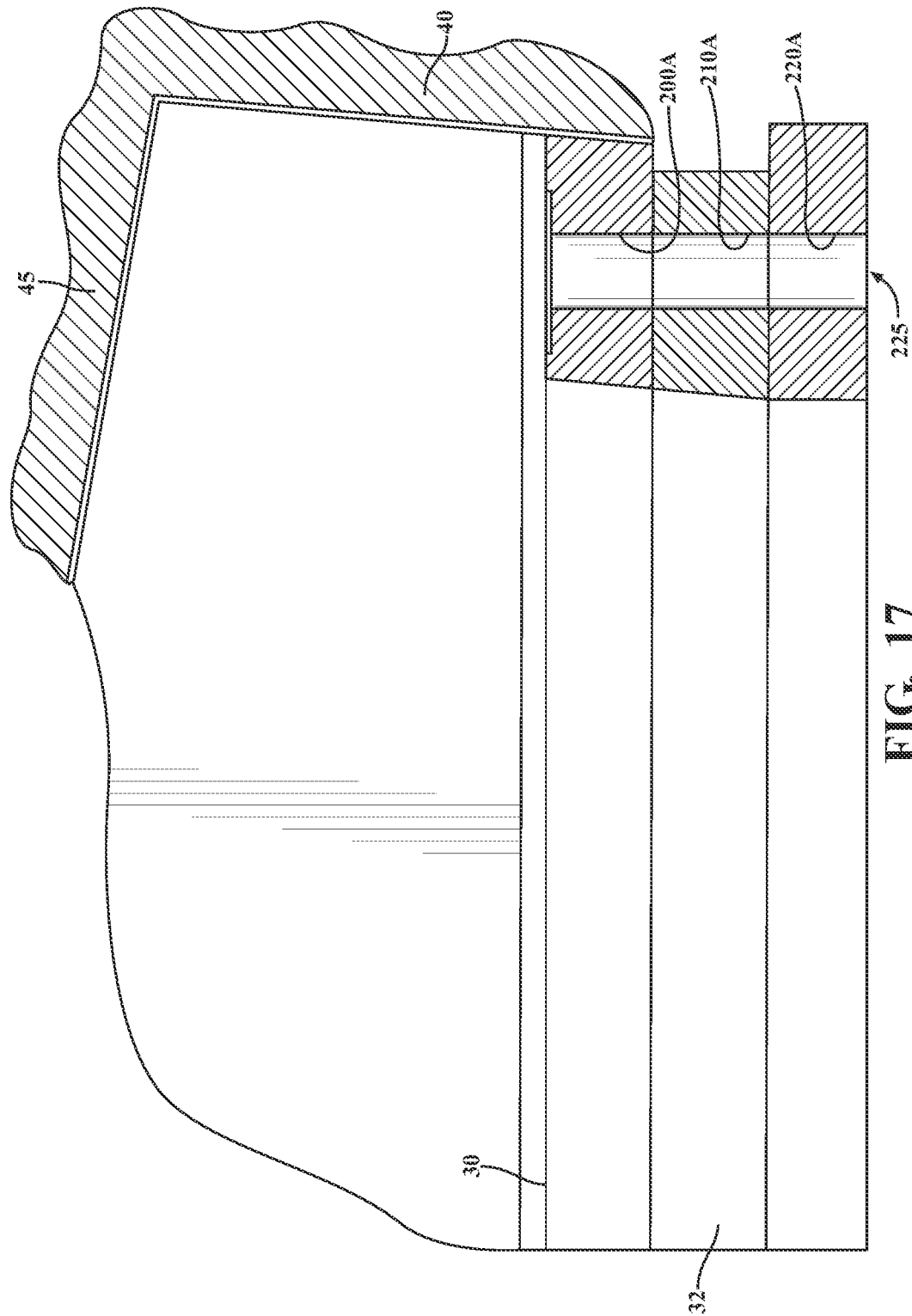
FIG. 17 is a perspective view of the further reamed and drilled hole of FIG. 16 with the portable drilling assembly removed.

Once the drilling assembly 20 reaches the lowered position, as in FIG. 15 and completes the reaming of the secondary hole 210A, the user/operator pivots the feed mechanism 80 (by actuating the pneumatic actuator 96) back to the raised position, as shown in FIG. 16. The user/operator then turns off the electric motor 60, and then turns off the magnetic base 105, and optionally moves the drilling assembly 20 away from the reamed pilot hole 200A and reamed secondary hole 210A and portion of the reamed tertiary hole 220A, as shown in FIG. 17. The reamer 130, 132 can then be uncoupled from the spindle 92, and the splined shaft 70 can be disconnected from the quick connect mechanism 65 of the gear 63.

Next, also illustrated in FIG. 17, the user/operator can clean the work area on the working surface 30 surrounding the reamed pilot hole 200A, reamed secondary hole 210B and reamed tertiary hole 220B and remove any debris and excess coolant.

In operations wherein the entirety of the tertiary hole 220 is desired to be reamed to the breakout opening 225, the operational method of the subject application may further include a second reaming step, as illustrated in FIGS. 18-22 below. The second reaming step follows similar operational steps to the second drilling step described above in FIGS. 8-12.

Figure 18:
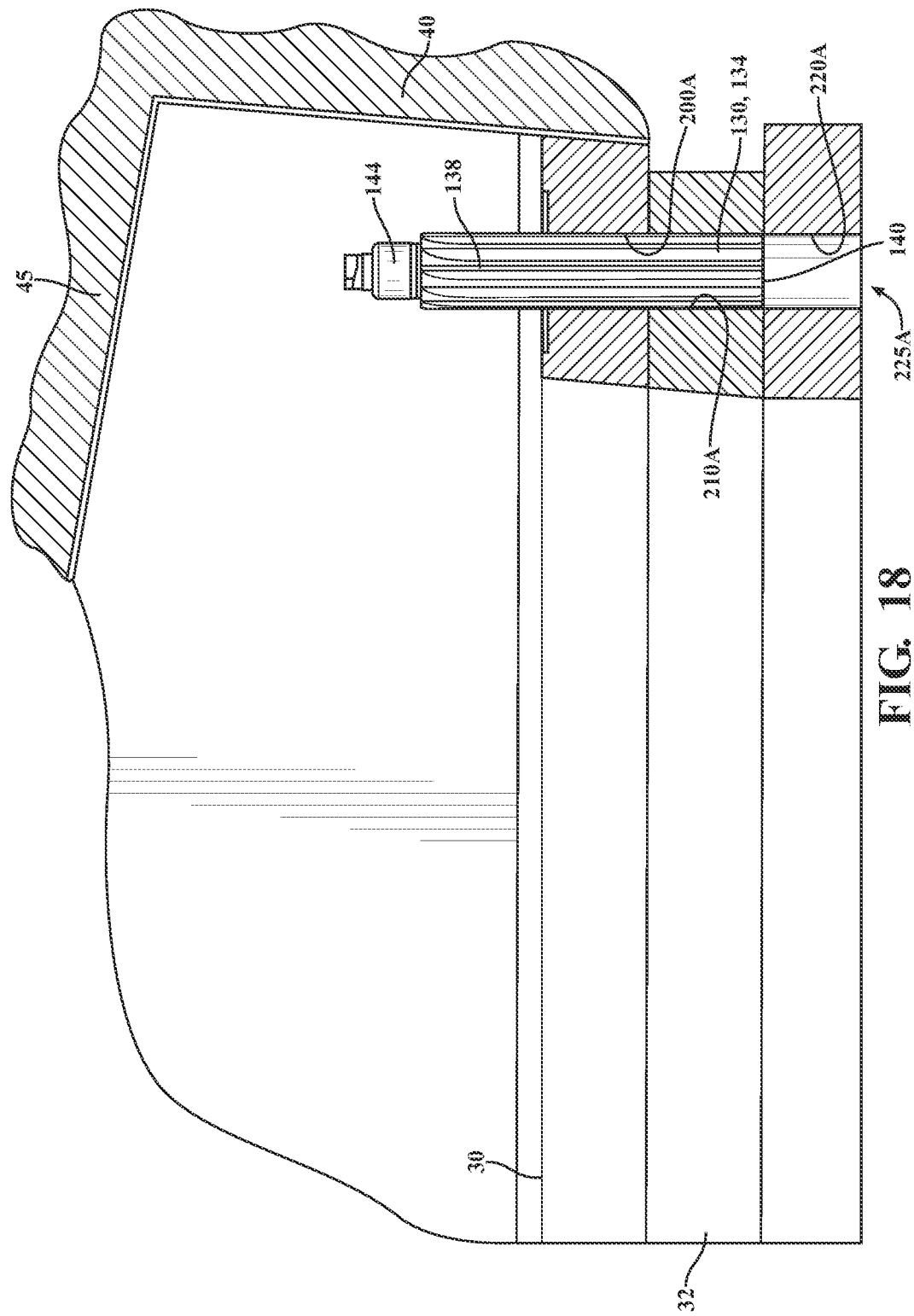
FIG. 18 is a front perspective view of the reamer of FIG. 2G positioned to be extending within the reamed pilot hole and reamed and drilled hole of the working surface of FIG. 17.

Referring now to FIG. 18, a second reamer 130, here shown as the longer reamer 134, is positioned within the tertiary hole 220 with the bottom end 120 seated at the bottom of the tertiary hole 220 and with the connection portion 124 exposed beneath the spindle 92.

Figure 19:
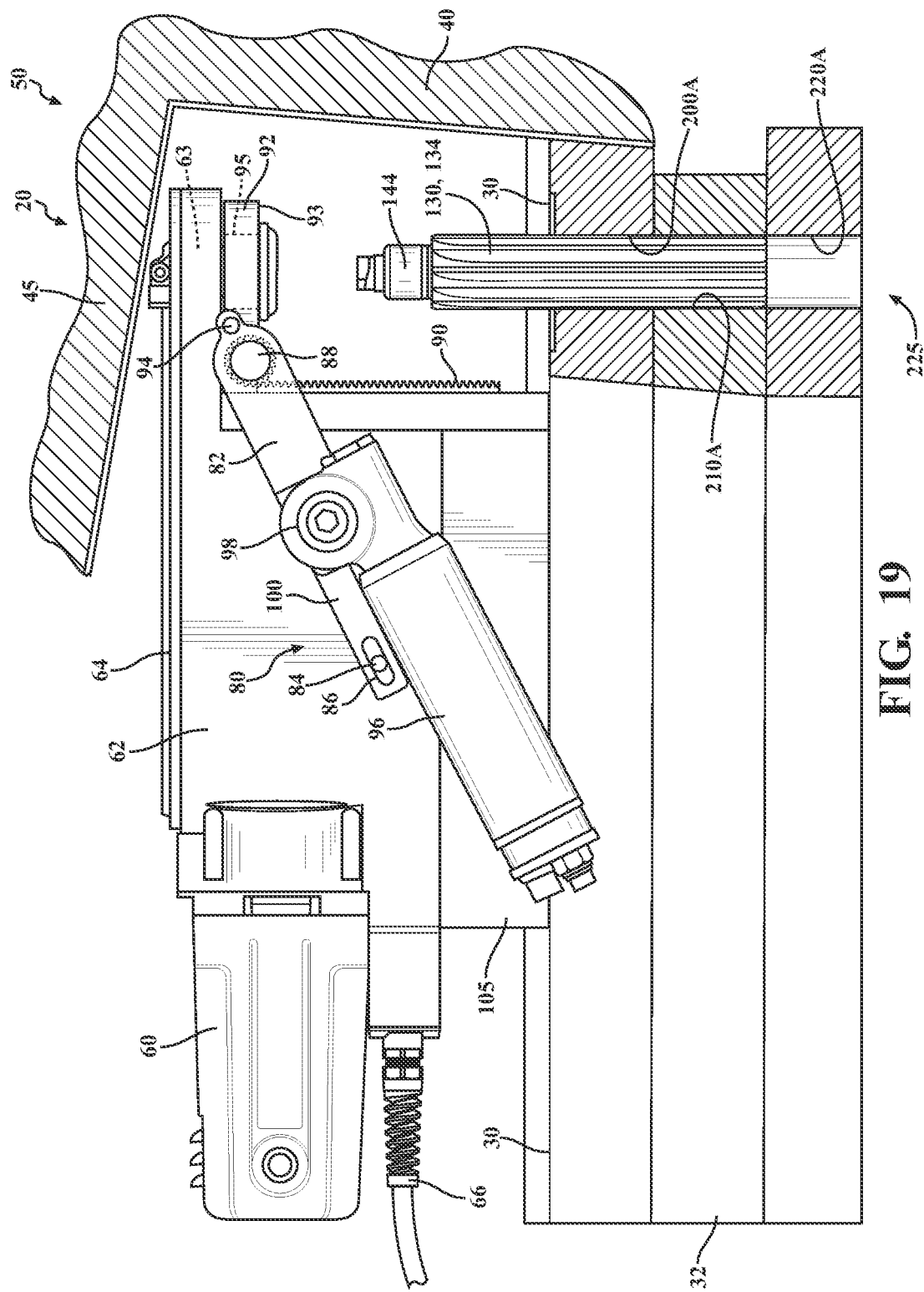
FIG. 19 is a perspective view of the portable drilling assembly of FIG. 18 in the raised position with the reamer of FIG. 2H positioned within the reamed and drilled hole and within the reamed pilot hole in the working surface prior to connecting the reamer of FIG. 2G being connected to the spindle and prior to connecting the splined shaft to the gear in the gear housing.

Next, as illustrated in FIG. 19, the user/operator pivots the feed mechanism 80 (by actuating the pneumatic actuator 96) from the raised position to an intermediate position. In this position, the connection portion 144 of the reamer 130, 134 is aligned and introduced within the interior of the spindle 92, and the user/operator inserts and tightens a set screw (not shown) to couple the reamer 130, 134 to the spindle 92. In addition, the user/operator raises the splined shaft 70 such that it can be quick connected to the gear 63 via the quick connection mechanism 65 in the same manner described above with respect to FIG. 3A and FIG. 11.

Figure 20:
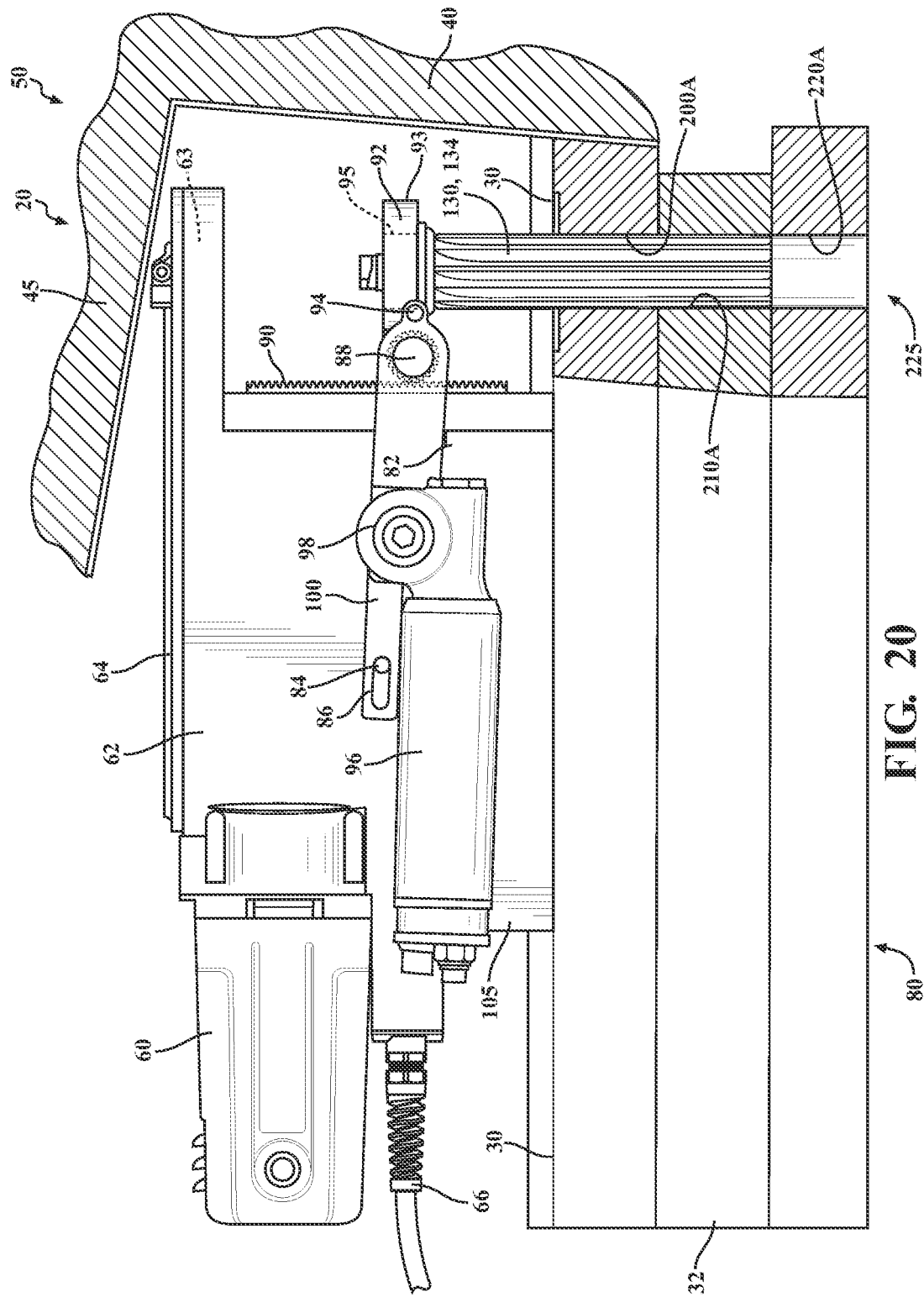
FIG. 20 is a perspective view of the portable drilling assembly of FIG. 19 in an intermediate position with the reamer of FIG. 2H positioned within the reamed and drilled hole and within the reamed pilot hole in the working surface after connecting the reamer of FIG. 2G to the spindle and prior to connecting the splined shaft to the gear in the gear housing.

Next, as illustrated in FIG. 20, the user/operator provides power to generate a magnetic field to magnetically mount and secure the magnetic base 105 of the portable electric drilling assembly 20 to the working surface 30. The user/operator actuates the electric motor 60 and the electric motor 60 rotates about a drive axis and rotates the gear 63 contained within the gear housing 64, which in turn rotates the splined shaft 70 quick connected to the gear 63 within the gear housing 64. At the same time, the intermeshing of the splines 74 of the splined shaft 70 with the splined regions 137 of the internal surface 136 causes the attached reamer 130, 134 to rotate in response. Stated another way, the rotation of the splined shaft 70 directly drives the rotation of the attached reamer 130, 134.

Figure 21:
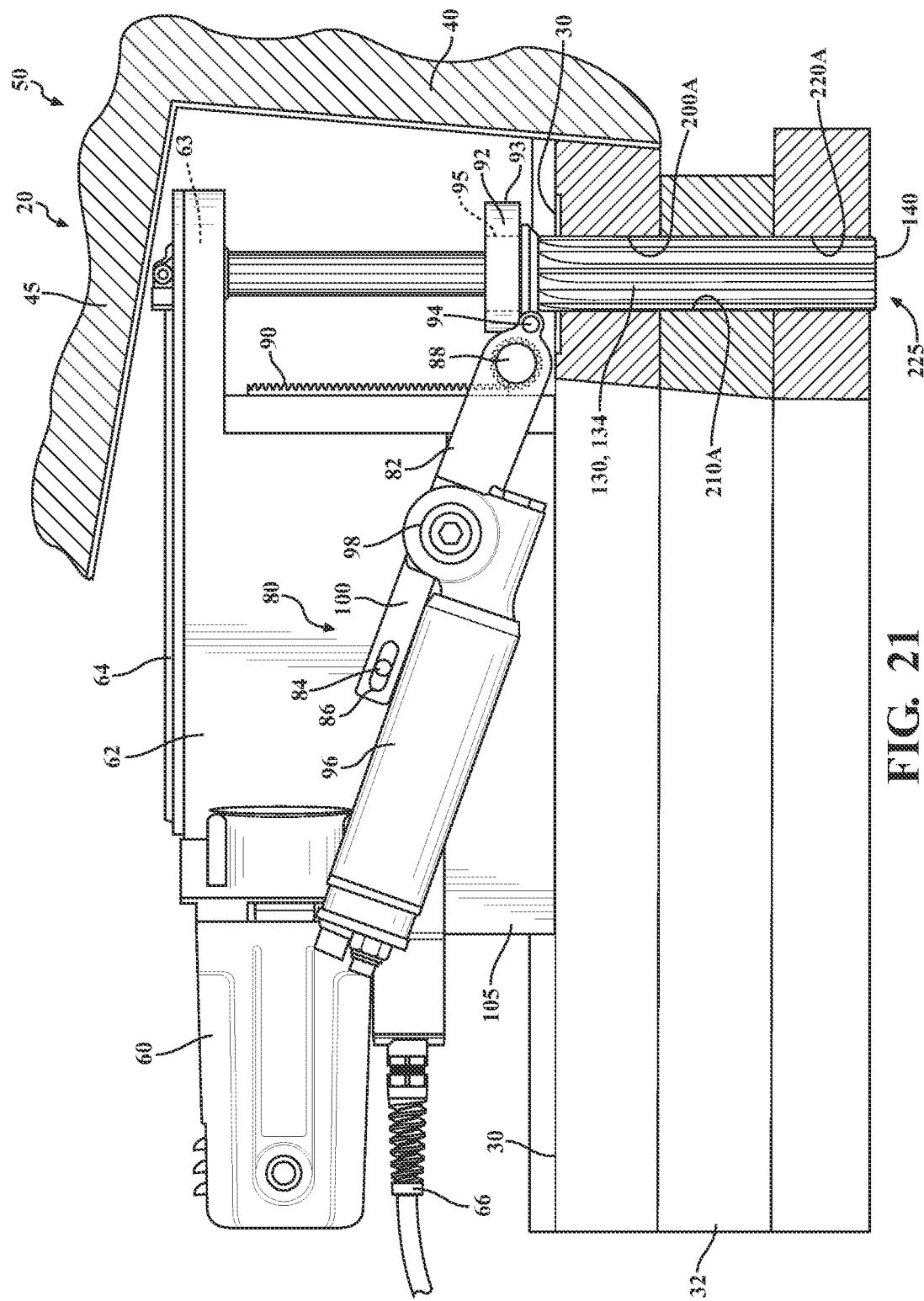
FIG. 21 is a perspective view of the portable drilling assembly of FIG. 21 moved to the lowered position within the further reamed and drilled hole and within the reamed pilot hole in the working surface of the workpiece after connecting the reamer of FIG. 2H to the spindle and after connecting the splined shaft to the gear in the gear housing.
Figure 22:
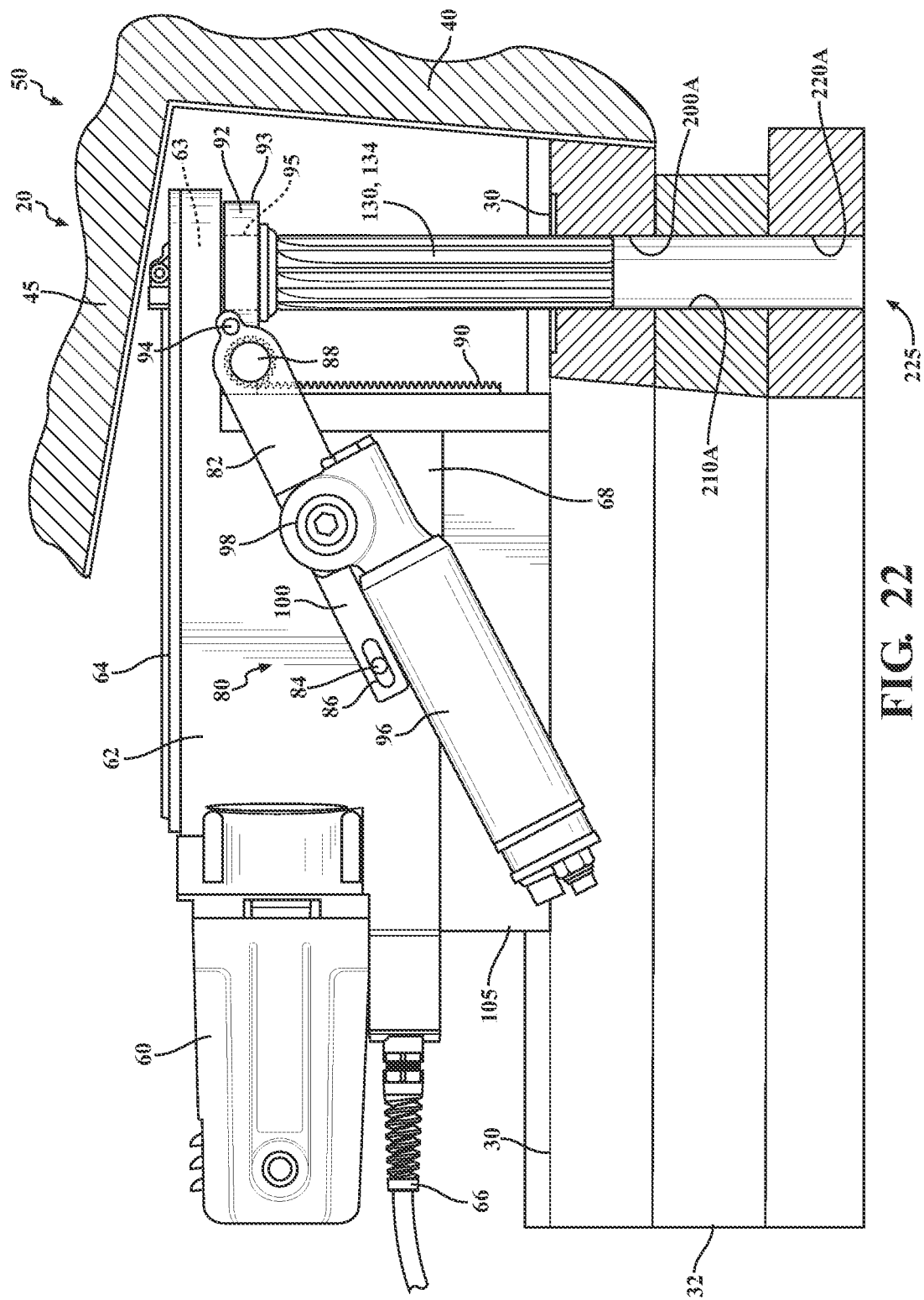
FIG. 22 is a front and close-up perspective view of the portable drilling assembly of FIG. 21 returned to the raised position from the lowered position with the reamer of FIG. 2H coupled to the spindle and positioned to be extending above the further reamed pilot hole and the still further reamed and drilled hole of the working surface.
Figure 23:
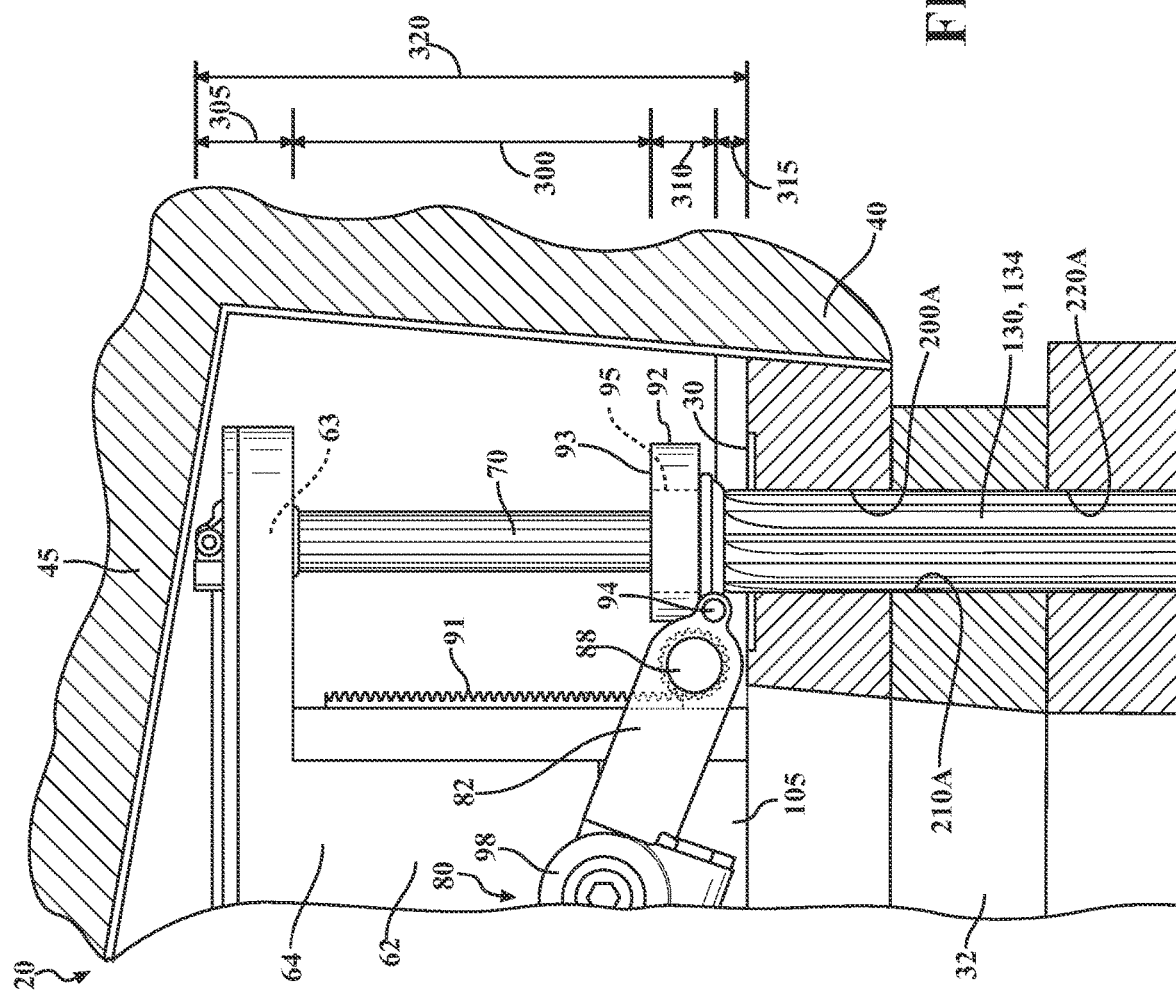
FIG. 23 is a perspective view of the portable drilling assembly of FIG. 22 illustrating the stoke length of the portable drilling assembly between the raised and lowered position that includes the splined shaft quick connected to the gear and also showing the reamer of FIG. 2H coupled to the spindle.

Next, the user/operator pivots the feed mechanism 80 (by actuating the pneumatic actuator 96) from the intermediate position (as shown in FIG. 20) to a lowered position (as shown in FIG. 21). The actuating of the pneumatic actuator 96 causes the pinion gear 88 to rotate and move in a rectilinear movement away from the gear 63 and towards the working surface 30 (downward as shown in FIG. 10) while remaining intermeshed with the teeth 91 in the rack 90. The rotation of the reamer 130, 134 during this movement from the intermediate position to the lowered position reams the entirety of the tertiary hole 220 in the workpiece 32 to the breakout opening 225. The result is a hole having a twice reamed pilot hole 200B, a twice reamed secondary hole 210B interconnected and extending from the twice reamed pilot hole 200B, and a once or twice reamed tertiary hole 220B interconnected and extending from the twice reamed secondary hole 210B. An optionally reamed breakout opening 225 is also provided in certain embodiments.

Once the drilling assembly 20 reaches the lowered position, as in FIG. 20 and completes the reaming of the tertiary hole 220 to form the reamed tertiary hole 220A, the user/operator pivots the feed mechanism 80 (by actuating the pneumatic actuator 96) back to the raised position, as shown in FIG. 21. The user/operator then turns off the electric motor 60, and then turns off the magnetic base 105, and optionally moves the drilling assembly 20 away from the drilled tertiary hole 220. The splined shaft 70 is unconnected from the quick connect mechanism of the gear 63, and then the reamer 130, 134 can then be uncoupled from the spindle 92. A cleaning operation, similar to that provided in FIG. 17 can then be performed to remove any debris or coolant from the working surface 30 surrounding the drilled and reamed openings.

FIGS. 24-26 illustrate an operational method for utilizing the portable electric drilling assembly 20 in accordance with another embodiment in which the handle 250 replaces the pneumatic system illustrated in FIGS. 1, 3-10, and 12-23 (including the pneumatic actuator 96 and the associated components) to drill and subsequently ream a hole into the working surface 30 of a workpiece 32 utilizing the two cutters 112, 114 and two reamers 132, 134 of the subject application. Similar to the prior embodiment, the operations of the portable electric drilling assembly 20 of FIGS. 24-26 are ideally suited for drilling such holes in workpiece 32 within a confined space 50, although the operation of the drilling assembly 20 in accordance with the description of FIGS. 24-26 can also be performed on workpieces not in a confined space. The operational method for utilizing the portable electric drilling assembly 20 in accordance with the embodiment in FIGS. 24-26 is very similar to the operational method of the pneumatic system illustrated in FIGS. 1, 3-10, and 12-23, but simply includes where the handle 250 is pivoted, as compared with the pneumatic system illustrated in FIGS. 1, 3-10, and 12-23, to achieve the same drilling and reaming result. For ease of description and illustration, movement between a raised position (FIG. 24) and a lowered position (FIG. 25) is described, but similar to the embodiment in FIGS. 1, 3-10, and 12-23 a plurality of intermediate positions between the raised and lowered positions are contemplated.

In general, during this operational method and similar to the operation method associated with the embodiment of FIGS. 1, 3-10 and 12-23 above, when the workpiece 32 is a metal workpiece, the portable electric drilling assembly 20 is disposed on the working surface 30, such as wherein the workpiece 32 is situated in the confined space 50. The user/operator operates a control switch (not shown) to provide power to generate a magnetic field to magnetically mount and secure the magnetic base 105 of the portable electric drilling assembly 20 to the working surface 30. The user/operator actuates the electric motor 60 and the electric motor 60 rotates about a drive axis and rotates the gear 63 contained within the gear housing 64, which in turn rotates the splined shaft 70 quick connected to the gear 63 within the gear housing 64. At the same time, the intermeshing of the splines 74 of the splined shaft 70 with the splined regions 108 of the internal surface 106 causes the attached cutter 110, 112, 114 (or the intermeshing of the splines 74 of the splined shaft 70 with the splined regions 137 of the internal surface 136 of the attached reamer 130, 132, 134) to rotate in response and drill or ream the hole to a desired cross-sectional diameter. Still further, by pivoting the handle 250 of the feed mechanism from a raised position to an intermediate or lowered position, the depth of the drill or ream the hole can be precisely controlled, with the maximum depth corresponding to the stroke length associated with the pivoting the handle of the feed mechanism 80 from a raised position to the lowered position as described further below.

Referring first to FIG. 24, the operational method begins wherein a first cutter 110 (here shown as the smaller cutter 112) is positioned above a pilot hole 200 with the connection portion 124 of the cutter 112 received within the internal diameter of the spindle 92 and with the handle 250 of the feed mechanism 80 positioned in the raised position wherein the spindle 92 and handle 250 are positioned in its closest proximity to the gear 63 and in its furthest proximity from the working surface 30 of the workpiece 32 and pilot hole 200. The pilot hole 200 has been predrilled into the working surface 30 and provides an orientation for guide for the drilling of the hole as provided in the operational method. In this position, the bottom end 120 of the cutter 110, 112, is positioned adjacent to the opening defining the pilot hole 200 at the working surface 30, and the user/operator inserts and tightens the set screw 97, typically with an Allen wrench, to couple the connection portion 124 of the cutter 110, 112 to the inner ring portion 95 of the spindle 92.

In addition, the splined shaft 70 is quick connected to the gear 63 via the quick connection mechanism 65, as best shown in FIG. 11. In particular, the splined shaft 70 is first aligned with and positioned beneath the gear 63 of the quick connect mechanism 65 by the user/operator, as shown in FIG. 11A. Next, as shown in FIG. 11B, the user/operator inserts the turned and milled upper end feature 72 of the splined shaft 70 within the quick connect mechanism 65. Finally, the splined shaft 70 is rotated a quarter turn in the opposite direction of the twisted flutes 118, thereby coupling the turned and milled upper end feature 72 with the gear 63, which allows the splined shaft 70 to rotate as the gear 63 rotates.

Next, the user/operator operates a control switch (not shown) to provide power to generate a magnetic field to magnetically mount and secure the magnetic base 105 of the portable electric drilling assembly 20 to the working surface 30. The user/operator actuates the electric motor 60 and the electric motor 60 rotates about a drive axis and rotates the gear 63 contained within the gear housing 64, which in turn rotates the splined shaft 70 quick connected to the gear 63 within the gear housing 64. At the same time, the intermeshing of the splines 74 of the splined shaft 70 with the splined regions 108 of the internal surface 106 causes the attached cutter 110, 112 (and inner ring portion 95 within the fixed outer portion 93 of the spindle 92) to rotate in response. Stated another way, the rotation of the splined shaft 70 directly drives the rotation of the attached cutter 110, 112.

Next, as shown in FIG. 25, the user/operator moves the feed mechanism 80 (by applying force in a downward direction as shown in FIGS. 24-26 to pivot the handle 250) from the raised position (as shown in FIG. 24) to an intermediate position with the ratchet mechanism in the second ratchet position (the first ratchet position is shown in FIG. 25). The force applied to the handle 250 downward pivots the handle 250 and causes the coupled pinion gear 88 to rotate and move in a rectilinear movement away from the gear 63 and towards the working surface 30 (downward as shown moving FIG. 24 to FIG. 25) while remaining intermeshed with the teeth 91 in the rack 90. The rotation of the cutter 110, 112 (caused by the rotation of the coupled splined shaft 70 and gear 63 rotated by the motor 60) during this movement from the raised position through the intermediate position to the lowered position drills a secondary hole 210 in the workpiece 32 of increasing depth in a direction away from the working surface 30 that is axially aligned with the pilot hole 200 to drill the secondary hole 210. In other words, the relative amount of movement of the feed mechanism 80, and in particular the handle 250, from the raised position (as shown in FIG. 24) through an intermediate position (as shown in FIG. 25) controls the relative depth of the secondary hole 210 drilled.

The depth of the secondary hole 210 beneath the pilot hole 200 is a function of a stroke length of the drilling assembly 20 with the attached cutter 110, 112 moved to the lowered position. In particular, the stroke length is defined as the length of movement of the spindle 92 between any two operating positions between and including the raised and lowered positions and may be determined by subtracting the height of the spindle 92 relative to the working surface 30 in a second operating position from the height of the spindle 92 relative to the working surface 30 in a first operating position, with the second operating position of the spindle 92 being closer to the working surface 30 than the first operating position of the spindle 92.

The maximum depth of the secondary hole 210 beneath the pilot hole 200, which is shown in FIG. 25, may be defined in terms of the maximum stroke length 300 of the drilling assembly 20 that is calculated by subtracting the gearbox height 305, the spindle height 310 and the chip clearance height 315 from the machine height 320 in the lowered position. In this calculation, the machine height 320 is fixed and is defined as the distance between the top of the gear box housing 64 and the working surface. Similarly, the gearbox height 305 is also fixed, and is defined as the distance between the top of the gear box housing and the bottom of the gear box housing 64 associated with portion of the gear box 62 including the quick connection mechanism 65. The spindle height 310 is further defined as the distance between the upper and lower surface of the spindle 92, while the chip clearance height 315 is further defined as the distance between the bottom of the spindle 92 and the working surface 30 of the workpiece 32 in the lowered position.

Once the drilling assembly 20 reaches the lowered position, as in FIG. 26 and completes the drilling of the secondary hole 210 and corresponding to the maximum stroke 300 in circumstances where the drilling assembly began in the raised position, the user/operator moves the rachet mechanism 239 to the first ratchet position (as shown in each of FIGS. 24-26) and moves the feed mechanism 80 (by applying force upward on the handle 250) back to the raised position, as shown in FIG. 24. The user/operator then turns off the electric motor 60, and then turns off the magnetic base 105 and turns of the electric motor 60 and moves the drilling assembly 20 away from the drilled secondary hole 210 from the lowered position to the raised position. The cutter 110, 112 can then be uncoupled from inner ring portion 95 of the spindle 92 by turning the set screw 97, typically using an Allen wrench, such that it is out of contact with the connection portion 124 of the first cutter 112, and the splined shaft 70 may optionally be unconnected from the quick connect mechanism of the gear 63. The first cutter 112 can then be removed from the secondary hole 210.

The operational method in accordance with the alternative embodiment illustrated in FIGS. 24-26 can also be used to subsequently drill the tertiary hole 220, and to subsequently ream the drilled hole 200, 210, 220 to form a reamed hole 200A, 210A, 220A, in substantially the same manner as described in the embodiment of FIGS. 1, 3-10, and 12-23 corresponding to the steps described above corresponding to FIGS. 6-10 and 12-23 and are not repeated herein for the sake of brevity, and the only distinctions between the operational methods are in terms of replacing the pivoting movement of the pneumatics including the pneumatic actuator 96 in FIGS. 6-10 and 12-23 with the movement of the handle 250 upward and downward between the raised and lowered position (i.e., the coupling/uncoupling of the second cutters 114 or the reamers 130, 132, 134 to the spindle 92 and the actual process whereby they respectively drill a secondary hole 210 or tertiary hole 220 and/or subsequently ream the holes 200, 210, 220 to form reamed holes 200A, 210A, 220A is the same in each embodiment.

FIGS. 27-29 illustrate an operational method for utilizing the portable electric drilling assembly 20 in accordance with another embodiment in which an electric feed mechanism 280 replaces the feed mechanism 80 including the pneumatic system illustrated in FIGS. 1, 3-10, and 12-23 (including the pneumatic actuator 96 and the associated components) to drill and subsequently ream a hole into the working surface 30 of a workpiece 32 utilizing the two cutters 112, 114 and two reamers 132, 134 of the subject application. Similar to the prior embodiment, the operations of the portable electric drilling assembly 20 of FIGS. 1, 3-10, and 12-23 and separately of FIGS. 24-26 are ideally suited for drilling such holes in workpiece 32 within a confined space 50, although the operation of the drilling assembly 20 in accordance with the description of FIGS. 27-29 can also be performed on workpieces not in a confined space. The operational method for utilizing the portable electric drilling assembly 20 in accordance with the embodiment in FIGS. 27-29 is very similar to the operational method of the pneumatic system illustrated in FIGS. 1, 3-10, and 12-23, and the handle 250 of FIGS. 24-26, but simply includes where the electric feed mechanism 280 replaces a portion of the components in the pneumatic system illustrated in FIGS. 1, 3-10, and 12-23 and is actuated to rotate the pinion gear 88 to achieve the same drilling and reaming result as in the embodiments of FIGS. 1, 3-10, and 12-23 and FIGS. 24-26 described above. For ease of description and illustration, movement between a raised position (FIG. 27), a single intermediate position (FIG. 28) and a lowered position (FIG. 29) is described, but similar to the embodiment in FIGS. 1, 3-10, and 12-23 and the embodiment in FIGS. 24-26, a plurality of intermediate positions between the raised and lowered positions are contemplated.

In general, the electric feed mechanism 280 having a mechanism housing 282 pivotally coupled to the gear box housing 64 with a fastening mechanism 284, here shown as a pin 284 contained within a slot 286 defined by the mechanism housing 282. The feed mechanism 280 includes the pinion gear 88 rotatably coupled and engaged to the rack 90. The drilling assembly 20 also includes the spindle 92, preferably the ring-shaped spindle 92 having an outer fixed portion 93, coupled to an end 295 of the mechanism housing 282 generally adjacent to the pinion gear 88. The spindle 92 also includes the inner ring portion 95 contained within the outer fixed portion 93 which is rotatable relative to the outer fixed portion 95. In particular, the pinion gear 88 is engaged (i.e., intermeshed) with the teeth 91 of the rack 90 and moves along the rack 90 as it rotates to achieve rectilinear movement of both the pinion gear 88 and the spindle 92 (i.e., up and down movement as illustrated in the Figures) during a drilling operation similar to the mechanism describe in each of the embodiments illustrated in FIGS. 1, 3-10, and 12-23 and 24-26, respectively.

The electric feed mechanism 280 also includes a power feed control box 290 that an electrical connector 292 for coupling to an electrical power source (not shown), an electrical switch 294 including an up button 296 and a down button 298, an upper limit switch 300, a lower limit switch 302, and an electric motor (now shown) which is electrically coupled to the electrical switch and which is mechanically coupled to the plurality of feed gears, including the feed gear 98, contained within the mechanism housing 282.

In general, during this operational method and similar to the operation method associated with the embodiment of FIGS. 1, 3-10 and 12-23 and the embodiment of FIGS. 24-26 above, when the workpiece 32 is a metal workpiece, the portable electric drilling assembly 20 is disposed on the working surface 30, such as wherein the workpiece 32 is situated in the confined space 50. The user/operator operates a control switch (not shown) to provide power to generate a magnetic field to magnetically mount and secure the magnetic base 105 of the portable electric drilling assembly 20 to the working surface 30. The user/operator actuates the electric motor 60 and the electric motor 60 rotates about a drive axis and rotates the gear 63 contained within the gear housing 64, which in turn rotates the splined shaft 70 quick connected to the gear 63 within the gear housing 64. At the same time, the intermeshing of the splines 74 of the splined shaft 70 with the splined regions 108 of the internal surface 106 causes the attached cutter 110, 112, 114 (or the intermeshing of the splines 74 of the splined shaft 70 with the splined regions 137 of the internal surface 136 of the attached reamer 130, 132, 134) to rotate in response and drill or ream the hole to a desired cross-sectional diameter. Still further, the user actuates the electric feed mechanism 280 to move the portable drill assembly 20 from a raised position to an intermediate or lowered position, the depth of the drill or ream the hole can be precisely controlled, with the maximum depth corresponding to the stroke length associated with the length of the movement of the spindle 92 from a raised position to the lowered position as described further below.

Referring first to FIG. 27, the operational method begins wherein a first cutter 110 (here shown as the smaller cutter 112) is positioned above a pilot hole 200 with the connection portion 124 of the cutter 112 received within the internal diameter of the spindle 92 and with the pivoting feed mechanism 80 positioned in the raised position wherein the spindle 92 is positioned in its closest proximity to the gear 63 and in its furthest proximity from the working surface 30 of the workpiece 32 and pilot hole 200. The pilot hole 200 has been predrilled into the working surface 30 and provides an orientation for guide for the drilling of the hole as provided in the operational method. In this position, the bottom end 120 of the cutter 110, 112, is positioned adjacent to the opening defining the pilot hole 200 at the working surface 30, and the user/operator inserts and tightens the set screw 97 (see FIGS. 11A-C), typically with an Allen wrench, to reversibly couple the connection portion 124 of the cutter 110, 112 to the inner ring portion 95 of the spindle 92. As one of skill appreciates, by loosening the set screw 97, the process of coupling the connection portion 124 of the cutter 110, 112 to the inner ring portion 95 of the spindle 92 can be reversed.

In addition, the splined shaft 70 is quick connected to the gear 63 via the quick connection mechanism 65, as also best shown in FIGS. 11A-11C. In particular, the splined shaft 70 is first aligned with and positioned beneath the gear 63 which includes a quick connect mechanism 65 by the user/operator, as shown in FIG. 11A, by twisting the splined shaft 70 in a clockwise or counterclockwise direction until the splines 74 of the splined shaft 70 are aligned with the internal opening 63A within the gear 63 and with the inwardly extending recessed portion 73 not including the ledge 77 aligned beneath the steel pin 67. Next, as shown in FIG. 11B, the user/operator inserts the turned and milled upper end feature 72 of the splined shaft 70 within the internal opening 63A of the gear 63 by moving the splined shaft 70 towards the gear 63 (shown by arrow 71) such that the turned and milled upper end feature 72 of the splined shaft 70 is contained within the internal opening 63A within the gear 63. Finally, the splined shaft 70 is rotated a quarter turn (shown by arrow 81), thereby positioning the ledge 77 adjacent to and above the quick connect feature 65 (i.e., above the steel pin 67). In this position, the splined shaft 70 cannot be pulled in a direction away from the gear 63 and gear housing 64 towards the working surface 30 because the ledge 77 is prevented from moving by the quick connect mechanism 65, here the steel pin 67. In the connected position, the gear 63 is engaged with the splined shaft 70, and hence the splined shaft 70 rotates as the plurality of gears 63 are rotated.

To disconnect the splined shaft 70 from the quick connect feature 65 and remove the splined shaft 70 from engagement with the gear 63, the user rotates the splined shaft 70 a quarter turn in the opposite direction of arrow 81, at which point the inwardly extending recessed portion 73 is aligned with the steel pin 67 but wherein the ledge 77 is not above the steel pin 67 of the quick connect feature 65, which allows the user/operator to move the splined shaft 70 away from the gear box 64 towards the working surface 30 (i.e., in an opposite direction to arrow 71 shown in FIG. 11B) to the unconnected position as shown in FIG. 11A.

Referring back to FIG. 27, and while not illustrated specifically in these figures, it is understood that a maximum length of the splined shaft 70 (hidden within the cutter 110, 112 as illustrated) is received within the component cavity defined by the internal surface 106 of the cutter 110, 112.

Next, the user/operator operates a control switch (not shown) to provide power to generate a magnetic field to magnetically mount and secure the magnetic base 105 of the portable electric drilling assembly 20 to the working surface 30. The user/operator actuates the electric motor 60 and the electric motor 60 rotates about a drive axis and rotates the gear 63 contained within the gear housing 64, which in turn rotates the splined shaft 70 quick connected to the gear 63 within the gear housing 64. At the same time, the intermeshing of the splines 74 of the splined shaft 70 with the splined regions 108 of the internal surface 106 causes the attached cutter 110, 112 (and inner ring portion 95 contained within the fixed outer portion 93 of the spindle 92) to rotate in response. Stated another way, the rotation of the splined shaft 70 directly drives the rotation of the attached cutter 110, 112 which drives the rotation of the inner ring portion 95.

Next, as shown in FIG. 27-29, the user/operator actuates the electrical switch 294, here depressing the down switch 298, which results in the pivoting of the electric feed mechanism 280 and movement of the spindle 92 from the raised position (as shown in FIG. 27) through an intermediate position (as shown in FIG. 28) to a lowered position (as shown in FIG. 5). The actuation of the electrical switch 294, here the depression of the down switch 298, causes the feed gears 98 and the coupled pinion gear 88 to rotate, which causes the pinion gear 88 to move in a rectilinear movement away from the gear 63 and towards the working surface 30 (downward as shown in FIGS. 28 and 29 relative to FIG. 27) while remaining intermeshed with the teeth 91 in the rack 90. The rotation of the cutter 110, 112 (caused by the rotation of the coupled splined shaft 70 and gear 63 rotated by the motor 60) during this movement from the raised position through the intermediate position to the lowered position drills a secondary hole 210 in the workpiece 32 of increasing depth in a direction away from the working surface 30 that is axially aligned with the pilot hole 200 (as best shown in FIGS. 28 and 29). In other words, the relative amount of pivoting of the electric feed mechanism 280 from the raised position (as shown in FIG. 27) through an intermediate position (as shown in FIG. 28) to a lowered position (as shown in FIG. 29) controls the relative depth of the secondary hole 210 drilled.

The depth of the secondary hole 210 beneath the pilot hole 200 is a function of a stroke length of the drilling assembly 20 with the attached cutter 110, 112 pivoted to the lowered position. In particular, the stroke length is defined as the length of movement of the spindle 92 between any two operating positions between and including the raised and lowered positions and may be determined by subtracting the height of the spindle 92 relative to the working surface 30 in a second operating position from the height of the spindle 92 relative to the working surface 30 in a first operating position, with the second operating position of the spindle 92 being closer to the working surface 30 than the first operating position of the spindle 92.

The maximum depth of the secondary hole 210 beneath the pilot hole 200, which is shown in FIG. 29, may be defined in terms of the maximum stroke length 300 of the drilling assembly 20 that is calculated by subtracting the gearbox height 305, the spindle height 310 and the chip clearance height 315 from the machine height 320 in the lowered position. In this calculation, the machine height 320 is fixed and is defined as the distance between the top of the gear box housing 64 and the working surface. Similarly, the gearbox height 305 is also fixed, and is defined as the distance between the top of the gear box housing and the bottom of the gear box housing 64 associated with portion of the gear box 62 including the quick connection mechanism 65. The spindle height 310 is further defined as the distance between the upper and lower surface of the spindle 92, while the chip clearance height 315 is further defined as the distance between the bottom of the spindle 92 and the working surface 30 of the workpiece 32 in the lowered position. In this exemplary embodiment, the upper limit switch 300 and lower limit switch 302 function to limit the amount the electrical feed mechanism 280 can pivot, and thus can separately be used to define the maximum depth of the secondary hole 210 according to the calculations above.

As also shown in FIG. 29, the positioning of the electric feed mechanism 280 in the lowered position is such wherein a minimum length of the splined shaft 70 is received within the component cavity defined by the internal surface 106 of the cutter 110, 112, but wherein this minimum length still results in the engagement of the splines 74 of the splined shaft 70 with the corresponding splined regions 108 of the internal surface 106 of the cutter 110, 112, and thus the rotation of the splined shaft 70 results in the rotation of the attached cutter 110, 112 as described above.

Once the drilling assembly 20 reaches the lowered position, as in FIG. 29 and completes the drilling of the secondary hole 210 and corresponding to the maximum stroke 300 in circumstances where the drilling assembly began in the raised position, the user/operator pivots the electric feed mechanism 280 by depressing the up button 296 back to the raised position, as shown in FIG. 27. The user/operator then turns off the electric motor 60 and then turns off the magnetic base 105 and moves the drilling assembly 20 away from the drilled secondary hole 210 from the lowered position to the raised position. The cutter 110, 112 can then be uncoupled (i.e., decoupled) from inner ring portion 95 of the spindle 92 by turning the set screw 97, typically using an Allen wrench, such that it is out of contact with the connection portion 124 of the first cutter 112, and the splined shaft 70 may optionally be unconnected from the quick connect mechanism of the gear 63. The first cutter 112 can then be removed from the secondary hole 210.

The operational method in accordance with the alternative embodiment illustrated in FIGS. 27-29 can also be used to subsequently drill the tertiary hole 220, and to subsequently ream the drilled hole 200, 210, 220 to form a reamed hole 200A, 210A, 220A, in substantially the same manner as described in the embodiment of FIGS. 1, 3-10, and 12-23 corresponding to the steps described above corresponding to FIGS. 6-10 and 12-23 and are not repeated herein for the sake of brevity, and the only distinctions between the operational methods are in terms of replacing the pivoting movement of the pneumatics including the pneumatic actuator 96 in FIGS. 6-10 and 12-23 with the pressing of the up button 284 or down button 282 to pivot the electric feed mechanism between the raised and lowered position (i.e., the coupling/uncoupling of the second cutters 114 or the reamers 130, 132, 134 to the spindle 92 and the actual process whereby they respectively drill a secondary hole 210 or tertiary hole 220 and/or subsequently ream the holes 200, 210, 220 to form reamed holes 200A, 210A, 220A is the same in each embodiment.

The subject application thus provides a solution for deep hole drilling processes for use in applications that also may have confined spaces to perform such drilling processes. By allowing for the separate connection of the splined shaft 70 and the cutter 110 or reamer 130 to form a cutter-spline drive prior to the operation of the portable electrical drilling assembly 20, the drilling assembly 20 footprint can be reduced as compared with conventional COTS for use in confined spaces and provides for a method for drilling deep holes having a reduced number of steps necessary to achieve a desired final hole dimensional requirements.

The portable electrical drilling assembly 20 allows for the use of different length and dimensioned cutters 110 and reamers 130 for use with a common splined shaft 70 as a part of the cutter-spline drive that therefore allow the assembly 20 to easily drill and ream holes of varying depths and inner radial dimensions without increasing the footprint of portable electrical drilling assembly 20 between its raised and lowered positions.

The subject application is also directed to the use of the cutter-spline drive including the combination of the splined shaft 70 and cutters 110 or reamers 130 in other drilling assemblies other than portable electrical drilling assembly 20 described above. In these applications, and similar to the description above, the rotation of the splined shaft 70, coupled within the internal surface 116, 136 of the respective cutter 110 or reamer 130, drives the rotation of the respective cutter 110 or reamer 130 to drill or ream a hole within the working surface 30 of the workpiece 32.

Still further, the subject application is also directed solely to the cutters 110 and reamers 130 for use in drilling assemblies that may include an associated splined shaft for driving the rotation of the cutters or reamers to drill or ream a hole in the within the working surface 30 of the workpiece 32.

As one appreciates, secondary or tertiary holes 210, 220 can be drilled and reamed with varying depths and varying diameters in the workpiece 32 utilizing the portable drilling assembly 20 of the present disclosure, in accordance with the method described in FIGS. 3-10 and 15-22 and alternatively in FIGS. 24-25 above, without having to adjust the machine height 320 of the drilling assembly 20 above the working surface 30 of the workpiece 32 and while maintaining the same maximum stroke 300 for the drilling assembly 20 between the raised and lowered position. The drilling assembly 20 and associated method of use with the cutters 110 and reamers 130 provided herein is therefore particularly advantageous for use in drilling and reaming operations in which there is limited clearance in the area surrounding the drilling assembly 20 and workpiece 32 as defined by the walls 40 and roof 45 or the other encumbrances in proximity to the workpiece 32.

While the disclosure has been described with reference to the examples above, it will be understood by those skilled in the art that various changes may be made, and equivalents may be substituted for elements thereof, without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all examples falling within the scope of the appended claims.

The invention claimed is:

1. A portable electrical drilling assembly configured for drilling holes in a surface of a workpiece, said drilling assembly comprising:
    a gear box comprising one or more gears;
    a feed mechanism coupled to said gear box and movable relative to said gear box between a plurality of positions including a raised position and a lowered position;
    a spindle coupled to said feed mechanism and configured to move rectilinearly toward or away from the surface of the workpiece as said feed mechanism moves between said plurality of positions;
    a cutting component coupled to said spindle;
    a splined shaft having a length between a first end and a second end with said first end reversibly coupled to one of said gears and with said second end coupled to one or both of said cutting component and said spindle; and
    an internal quick connector coupled to said one or more gears and reversibly coupled to said splined shaft.

2. The drilling assembly of claim 1, wherein said cutting component including an internal surface defining a component cavity, and wherein said length of said splined shaft at said second end includes a series of splines slidingly received within said component cavity and engaged with said internal surface of said cutting component.

3. The drilling assembly of claim 2, wherein said spindle has an outer ring portion and an inner ring portion positioned within and rotatable relative to said outer ring portion, and
wherein said cutting component is coupled with said inner ring portion of said spindle.

4. The drilling assembly of claim 3, wherein said cutting component is reversibly coupled to said inner ring portion of said spindle.

5. The drilling assembly of claim 3, wherein said feed mechanism comprises an electric feed mechanism, with said electric feed mechanism comprising:
a rack;
a pinion gear coupled to both of said rack and said outer ring portion of said spindle;
an electric actuator; and
one or more feed gears coupled to said electric actuator and contained within a mechanism housing with one of said one or more feed gears intermeshed with said pinion gear,
wherein actuation of said electric actuator rotates said one or more feed gears with said mechanism housing with the rotation of said one or more feed gears moving said electric feed mechanism relative to said gear box between said plurality of positions, and
wherein the rotation of said one or more feed gears also rotates said pinion gear with the rotation of said pinion gear also moving said pinion gear along said rack with said movement of said pinion gear along said rack causing rectilinear movement of said outer ring portion of said spindle toward or away from the surface of the workpiece.

6. The drilling assembly of claim 3, wherein said feed mechanism further comprises:
a rack;
a pinion gear coupled to both of said rack and said outer ring portion of said spindle;
a pneumatic actuator coupled to said gear box;
a slide assembly coupled to said pneumatic actuator; and
one or more feed gears coupled to said pneumatic actuator and contained within said slide assembly with said one or more feed gears intermeshed with said pinion gear,
wherein actuation of said pneumatic actuator rotates said one or more feed gears within said slide assembly with the rotation of said one or more feed gears moving said pneumatic actuator relative to said gear box between said plurality of positions, and
wherein the rotation of said one or more feed gears also rotates said pinion gear with the rotation of said pinion gear also moving said pinion gear along said rack with said movement of said pinion gear along said rack causing rectilinear movement of said outer ring portion of said spindle toward or away from the surface of the workpiece.

7. The drilling assembly of claim 3, wherein said feed mechanism further comprises:
a rack;
a pinion gear coupled to both of said rack and said outer ring portion of said spindle; and
a handle coupled to said gear box and movable between said plurality of positions, with said pinion gear being rotationally coupled to said handle,
wherein the movement of said handle between said plurality of positions rotates said pinion gear with the rotation of said pinion gear also moving said pinion gear along said rack with said movement of said pinion gear along said rack causing rectilinear movement of said outer ring portion of said spindle toward or away from the surface of the workpiece.

8. The drilling assembly of claim 2, wherein said spindle is positioned relative to said gear box such that a maximum length of said splined shaft is received within said component cavity of said cutting component when said feed mechanism is moved to said raised position and such that a minimum length of said splined shaft is received within said component cavity of said single cutting component when said feed mechanism is moved to said lowered position, and wherein said minimum length is less than said maximum length.

9. The drilling assembly of claim 1, wherein said cutting component comprises a cutter.

10. The drilling assembly of claim 9, wherein said cutting component comprises a reamer.

11. The drilling assembly of claim 1, wherein said feed mechanism is pivotable relative to said gear box between said plurality of positions including said raised position and said lowered position.

12. The drilling assembly of claim 1 further comprising a magnetic base coupled to a lower part of a gear box housing of said gear box and configured for positioning along a surface of the workpiece, said magnetic base being further configured to be actuated to generate a magnetic field to secure said magnetic base to the workpiece.

13. A method for drilling holes in a surface of a workpiece, said method comprising said steps of:
positioning a drilling assembly onto the workpiece at a desired position, the drilling assembly including a gear box having one or more gears with a motor coupled to the one or more gears, a feed mechanism coupled to the gear box and movable relative to the gear box between a plurality of positions including a raised position and a lowered position, a spindle coupled to the feed mechanism, and an internal quick connector coupled to the one or more gears;
providing a splined shaft extending in length between a first end and a second end;
reversibly coupling the first end of the splined shaft to the internal quick connector of the gear box with the splined shaft rotatable about a spline axis when the one or more gears are rotating;
positioning the feed mechanism in the raised position;
coupling a cutting component to one of the splined shaft or the spindle;
moving the feed mechanism to an intermediate position from the raised position to position a tip end of the cutting component in contact with a surface of the workpiece;
activating the motor to rotate the one or more gears, wherein the rotation of the one or more gears rotates the splined shaft, the cutting component and the spindle; and
drilling a hole of a predetermined length in the workpiece by moving the feed mechanism from the intermediate position to the lowered position with the motor activated.

14. The method of claim 13, wherein the cutting component comprises a first cutting component, and wherein said method further comprising said steps of:
deactivating the motor after said step of drilling a hole of a predetermined length in the component;
moving the feed mechanism from the lowered position to the raised position;

decoupling the first cutting component from the splined shaft or the spindle after said step of deactivating the motor;

coupling a second cutting component to the splined shaft or the spindle, the second cutting component having a shaft length which is greater than a shaft length of the first cutting component;

moving the feed mechanism from the raised position to the lowered position; and reactivating the motor to further drill the hole to an additional predetermined length in the workpiece, wherein the additional predetermined length of the hole is greater than the predetermined length of the hole.

15. The method of claim 14 further comprising said steps of:

decoupling the first end of the splined shaft from the internal quick connector of the gear box after said step of deactivating the motor and prior to said step of decoupling the first cutting component from the splined shaft or the spindle; and reversibly recoupling the first end of the splined shaft to the internal quick connector of the gear box after said step of coupling a second cutting component to the splined shaft or the spindle.

16. The method of claim 14 further comprising said steps of:

decoupling the first end of the splined shaft from the internal quick connector of the gear box after said step of deactivating the motor and after said step of moving the feed mechanism from the lowered position to the raised position and prior to said step of decoupling the first cutting component from the splined shaft or the spindle; and reversibly recoupling the first end of the splined shaft to the internal quick connector of the gear box after said step of coupling a second cutting component to the splined shaft or the spindle.

17. The method of claim 13, wherein the cutting component comprises a cutter, and wherein aid method further comprises said steps of:

moving the feed mechanism from the lowered position to the raised position;

deactivating the motor after said step of drilling a hole of a predetermined length in the workpiece;

decoupling the cutter from the splined shaft or the spindle;

coupling a reamer to the splined shaft or the spindle;

activating the motor and moving the feed mechanism from the raised position to the lower position to ream the hole having the predetermined length in the workpiece from a first radial diameter to a second radial diameter greater than the first radial diameter.

18. The method of claim 13, wherein the cutting component includes an internal surface defining a component cavity, and wherein a length of the splined shaft at the second end includes a series of splines slidingly received within the component cavity and engaged with the internal surface of the cutting component, and wherein said step of activating the motor comprises:

activating the motor to rotate the one or more gears, wherein the rotation of the one or more gears rotates the splined shaft, and wherein the rotation of the splined shaft rotates the cutting component, and wherein the rotation of the cutting component rotates the spindle.

19. The method of claim 18, wherein the spindle has an outer ring portion and an inner ring portion positioned within and rotatable relative to the outer ring portion, and wherein said step of coupling a cutting component to one of the splined shaft or the spindle comprises coupling a cutting component to the inner ring portion of the spindle, and wherein said step of activating the motor comprises activating the motor to rotate the one or more gears, wherein the rotation of the one or more gears rotates the splined shaft, and wherein the rotation of the splined shaft rotates the cutting component, and wherein the rotation of the cutting component rotates the inner ring portion of the spindle within the outer ring portion.

20. The method of claim 19 wherein the cutting component comprises a first cutting component, and wherein said method further comprising said steps of:

deactivating the motor after said step of drilling a hole of a predetermined length in the workpiece;

moving the feed mechanism from the lowered position to the raised position;

decoupling the first cutting component from the inner ring portion of the spindle after said step of deactivating the motor;

coupling a second cutting component to the inner ring portion of the spindle, the second cutting component having a shaft length which is greater than a shaft length of the first cutting component;

moving the feed mechanism from the raised position to the lowered position; and reactivating the motor to further drill the hole to an additional predetermined length in the workpiece, wherein the additional predetermined length of the hole is greater than the predetermined length of the hole.

21. The method of claim 20 further comprising said steps of:

decoupling the first end of the splined shaft from the internal quick connector of the gear box after said step of deactivating the motor; and reversibly recoupling the first end of the splined shaft to the internal quick connector of the gear box after said step of coupling a second cutting component to the inner ring portion of the spindle.

22. The method of claim 20 further comprising said steps of:

decoupling the first end of the splined shaft from the internal quick connector of the gear box after said step of deactivating the motor and after said step of moving the feed mechanism from the lowered position to the raised position and prior to said step of decoupling the first cutting component from the inner ring portion of the spindle; and reversibly recoupling the first end of the splined shaft to the internal quick connector of the gear box after said step of coupling a second cutting component to the inner ring portion of the spindle.

* * * * *